United States Patent
Katoh et al.

(10) Patent No.: US 10,331,369 B2
(45) Date of Patent: Jun. 25, 2019

(54) ARRAY CONTROL PROGRAM, ARRAY CONTROL METHOD, AND ARRAY CONTROL APPARATUS

(71) Applicant: FUJITSU LIMITED, Kawasaki-shi, Kanagawa (JP)

(72) Inventors: Takashi Katoh, Yokohama (JP); Keisuke Goto, Kawasaki (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 15/691,172

(22) Filed: Aug. 30, 2017

(65) Prior Publication Data

US 2018/0067677 A1    Mar. 8, 2018

(30) Foreign Application Priority Data

Sep. 2, 2016  (JP) .................................. 2016-171852

(51) Int. Cl.
  *G06F 12/00*  (2006.01)
  *G06F 3/06*  (2006.01)

(52) U.S. Cl.
  CPC .......... *G06F 3/0632* (2013.01); *G06F 3/0604* (2013.01); *G06F 3/0683* (2013.01)

(58) Field of Classification Search
  None
  See application file for complete search history.

(56) References Cited

U.S. PATENT DOCUMENTS

2008/0276036 A1    11/2008   Van Acht et al.

FOREIGN PATENT DOCUMENTS

| JP | H05-158783 | 6/1993 |
|----|-----------|--------|
| JP | 2002-207634 | 7/2002 |
| JP | 2004-030353 | 1/2004 |
| JP | 2009-521049 | 5/2009 |
| WO | 2007/072367 | 6/2007 |

OTHER PUBLICATIONS

Alfred V. Aho et al, "The Design and Analysis of Computer Algorithms", Dynamic Programming, Addison-Wesley, 1974, pp. 67-74 (14 pages).

Gonzalo Navarro, "Dynamic Dictionaries in Constant Worst-Case Time", Technical Report TR/DCC-2007-11, University of Chile, Department of Computer Science, (preprint Nov. 2006) Oct. 2007 (16 pages).

*Primary Examiner* — John A Lane
(74) *Attorney, Agent, or Firm* — Fujitsu Patent Center

(57) ABSTRACT

An initializable array has a plurality of blocks each having an address word and a data word, a boundary indicative of a two-division position where the plurality of blocks is divided into two divided areas and an initial value for each element of the array is stored, the boundary is a position where a ratio for the number of unwritten blocks in a first area and the number of written blocks in a second area is an integer ratio. An array control program causes a computer to execute shifting the boundary to extend the first area and generating an initialized written block in the first area; in a case where a write destination block is an unwritten block in the second area, forming a link between the initialized written block in the first area and the write destination block; and writing a write value to the write destination block.

17 Claims, 39 Drawing Sheets

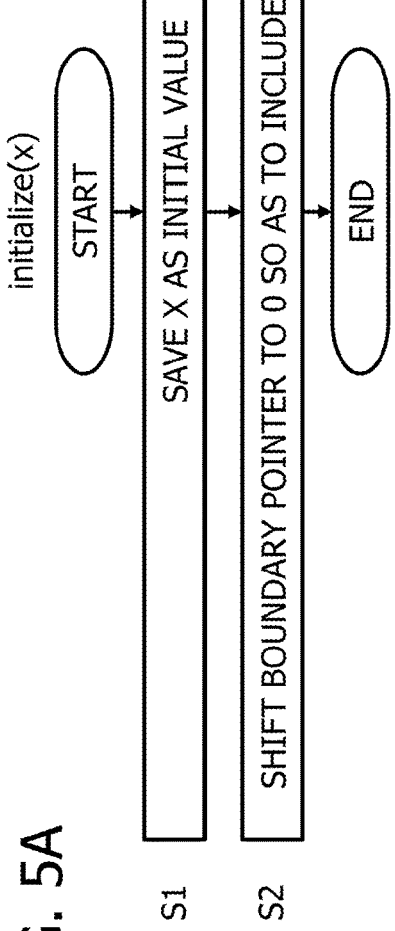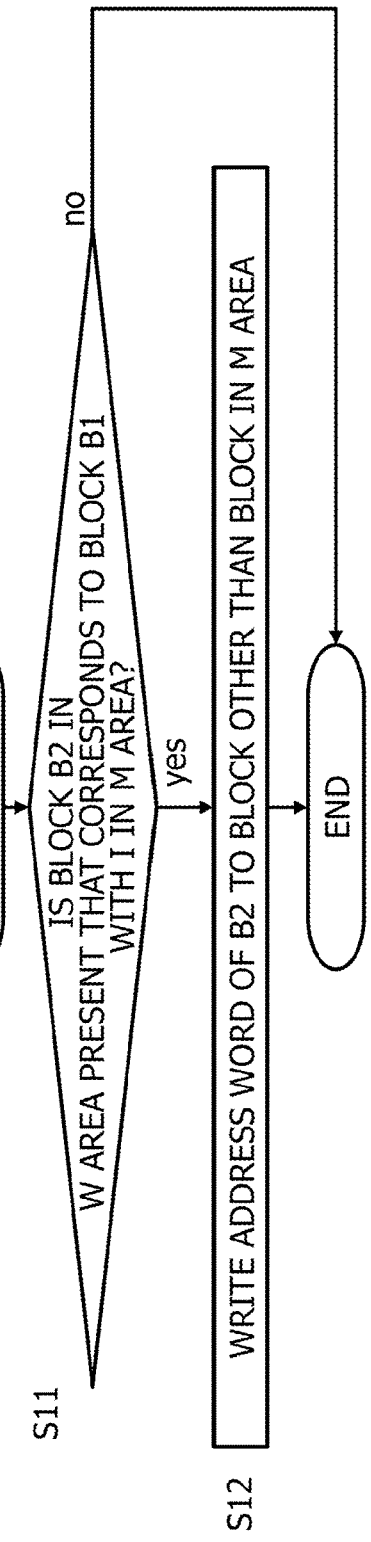

FIG. 6 initialize (x)

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | ? | ? | ? | ? | ? | ? | ? | ? | ? | ? | ? | ? | ? | ? | ? | ? |
| BLOCK AND TYPE | WS | WS | WS | WS | WS | WS | WS | WS | WS | WS | WS | WS | WS | WS | WS | WS |

BD_P BOUNDARY: 0

AR — M

INT INITIAL VALUE: X

BIDIRECTIONAL LINKS ARE ELIMINATED AND ALL BLOCKS ARE OF WS TYPE

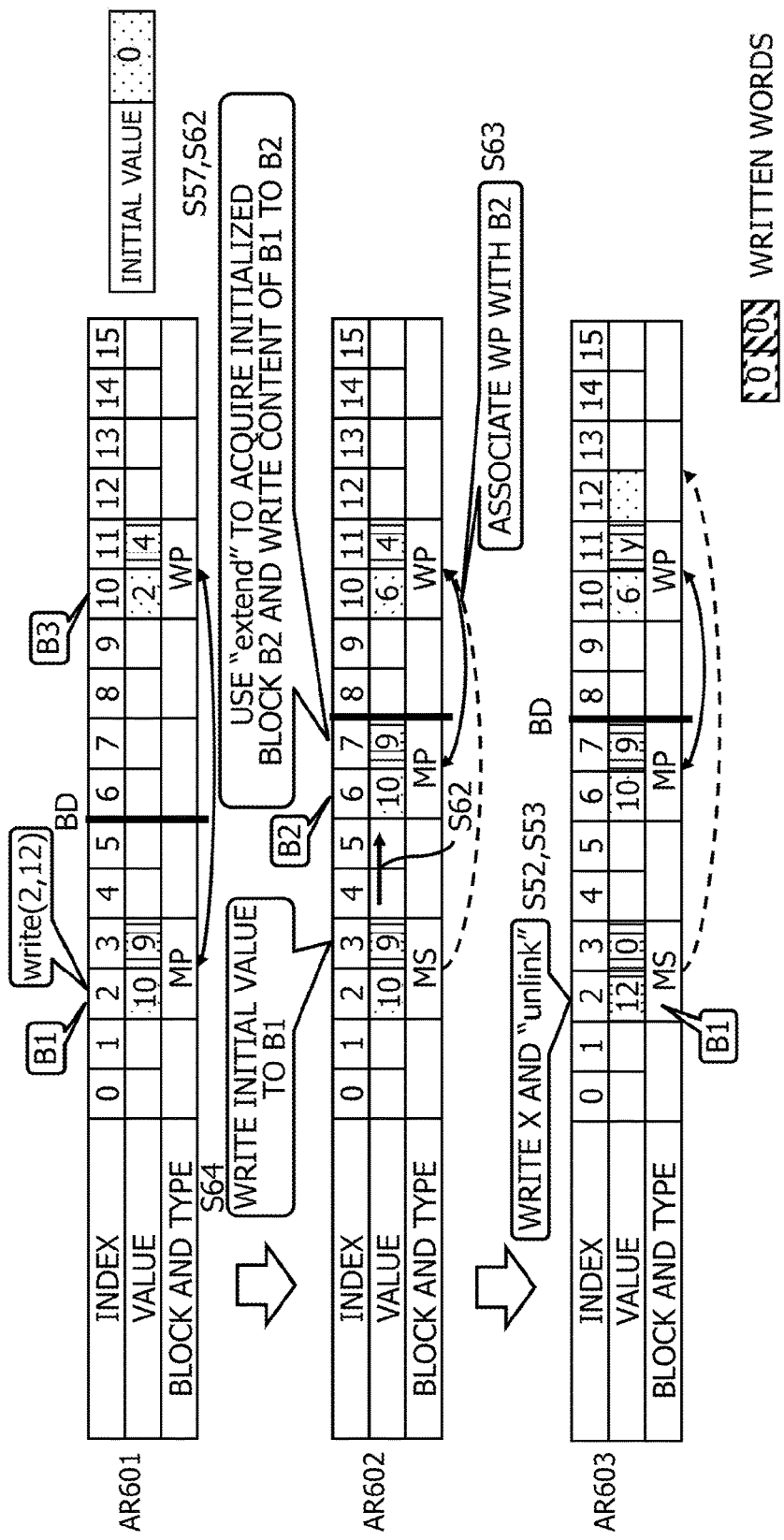

FIG. 18

INITIALIZABLE ARRAY THAT HAS LENGTH OF 16 AND IN WHICH 1 BLOCK = 2 WORDS

AR0

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 8 | 2 | 11 | 3 | 0 | 4 | 4 | 12 | 9 | 2 | 5 | 8 | 7 | 1 | 6 |
| BLOCK AND TYPE | MS | | MS | | MS | | MS | | MP | | MS | | WP | | WS | |

BD_P

| BOUNDARY POINTER | 12 |
|---|---|
| INITIAL VALUE | 13 |

INT

{ ALL VALUES ARE UNDEFINED IN INITIAL STATE }

TYPE OF BLOCK CAN BE CALCULATED IN CONSTANT TIME BASED ON VALUES OF INDEX, BOUNDARY POINTER, AND ADDRESS WORD. TYPES ARE NOT ACTUALLY SAVED initialize(0) // SET INITIAL VALUE TO 0 ⇒

S1, S2

CHANGE BOUNDARY POINTER AND INITIAL VALUE

AR1

| INDEX | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| VALUE | 10 | 8 | 2 | 11 | 3 | 0 | 4 | 4 | 12 | 9 | 2 | 5 | 8 | 7 | 1 | 6 |
| BLOCK AND TYPE | WS | | WS | | WS | | WS | | WS | | WS | | WS | | WS | |

BD

BD_P

| BOUNDARY POINTER | 0 |
|---|---|
| INITIAL VALUE | 0 |

BOUNDARY POINTER IS SET TO 0, AND THUS, ALL BLOCKS ARE OF WS TYPE

FIG. 21

FIG. 22 write(6,10) // WRITE 10 TO INDEX 6, W2-1

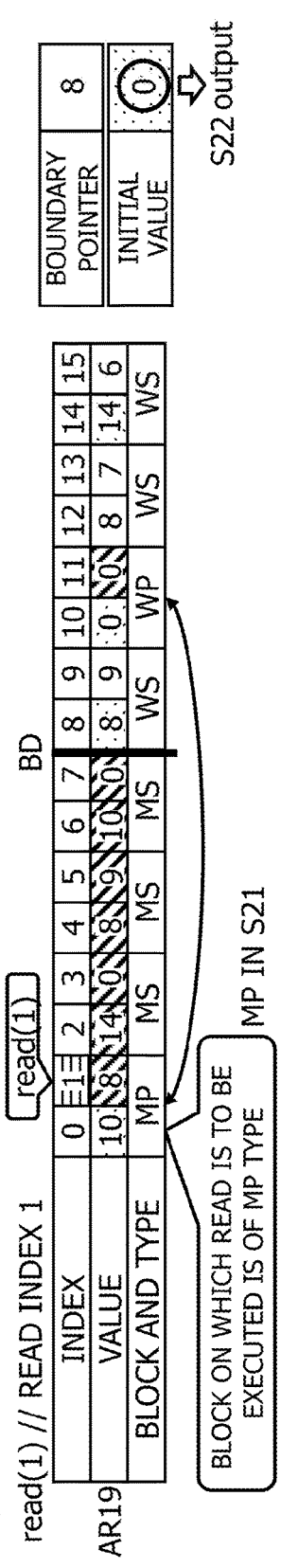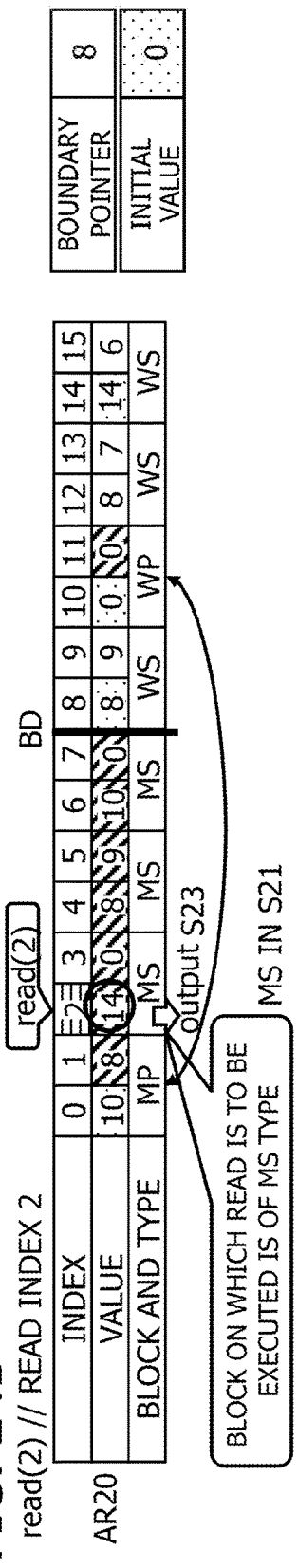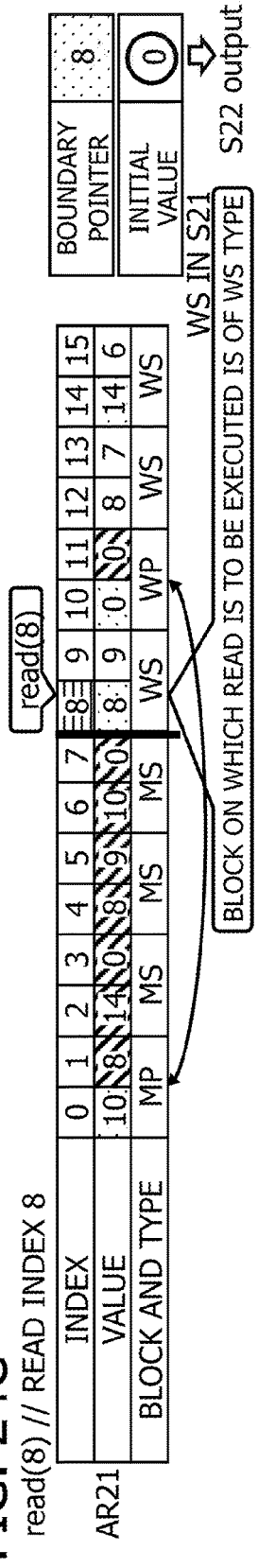

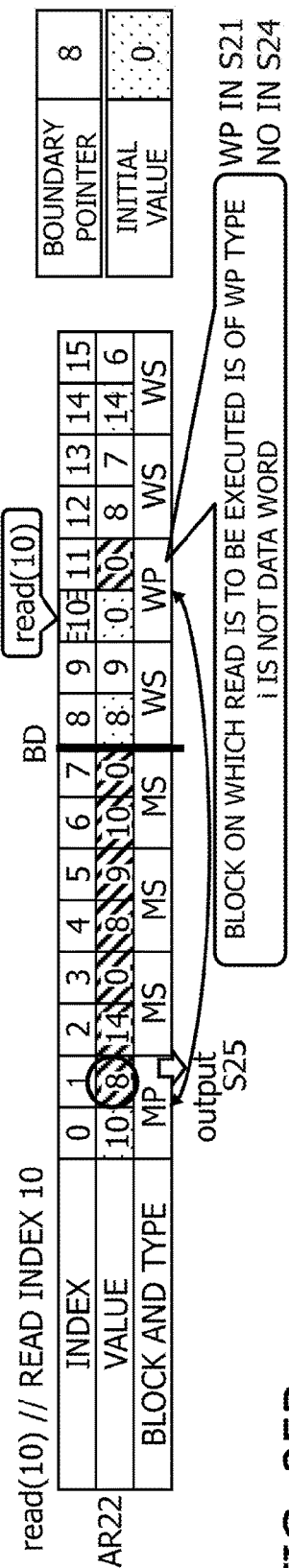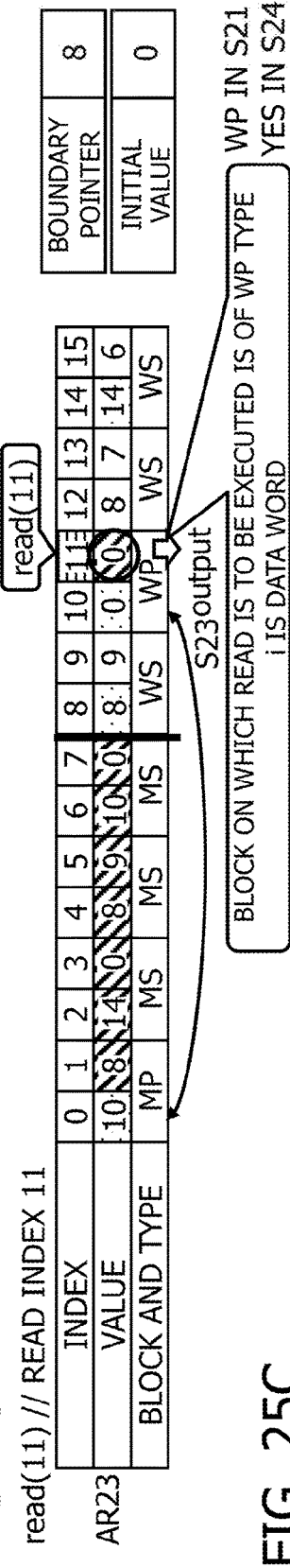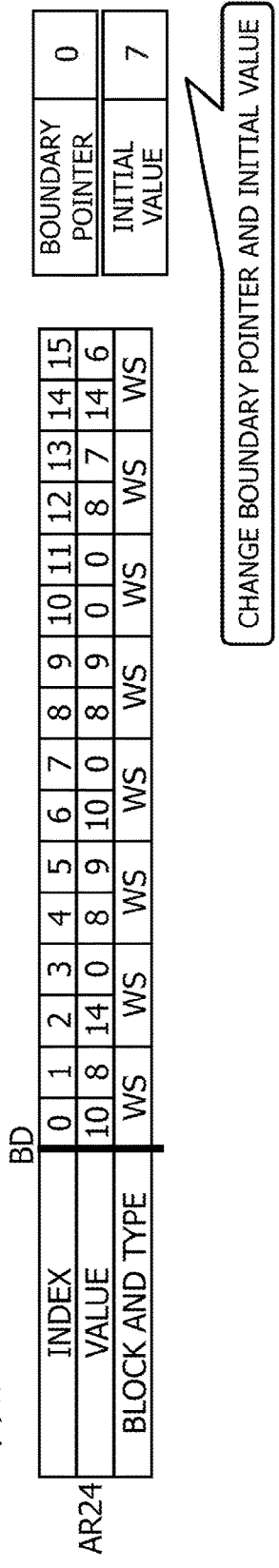

FIG. 29

| | actual (non-amortized) time complexity | | | space complexity |
| --- | --- | --- | --- | --- |
| | read | write | initialize | extra space |
| FIG. 37 | O(1) | O(1) | O(N) | O(1) : [implicit / in-place] |
| FIG. 38A | O(1) | O(1) | O(N/logN)=o(N) | O(N/logN)=o(N) : [succinct] |
| FIG. 38B | O(1) | O(1) | O(1) | O(N) : [compact] |
| FIG. 39 | O(1) | O(1) | O(1) | O(N/logN)=o(N) : [succinct] |
| THIRD EMBODIMENT | O(1) | O(1) | O(1) | 1bit = O(1) : [implicit / in-place] |

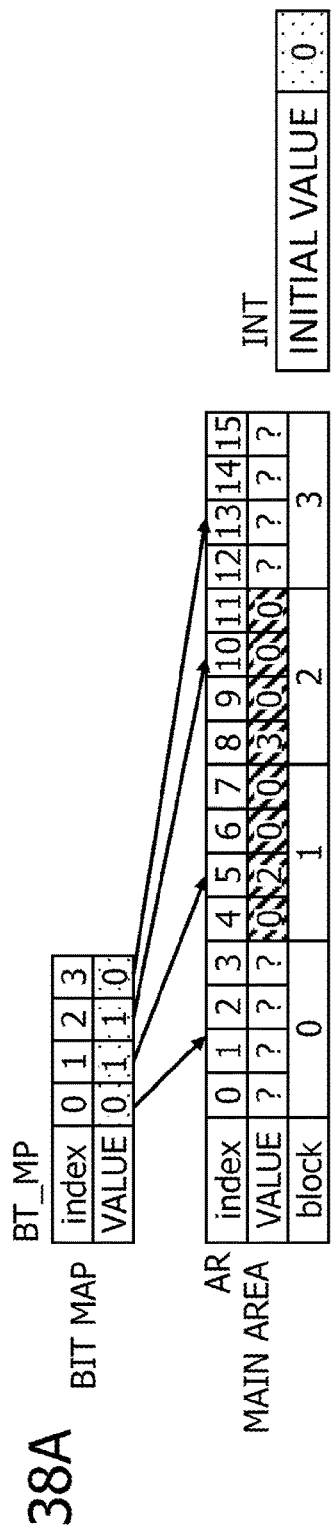
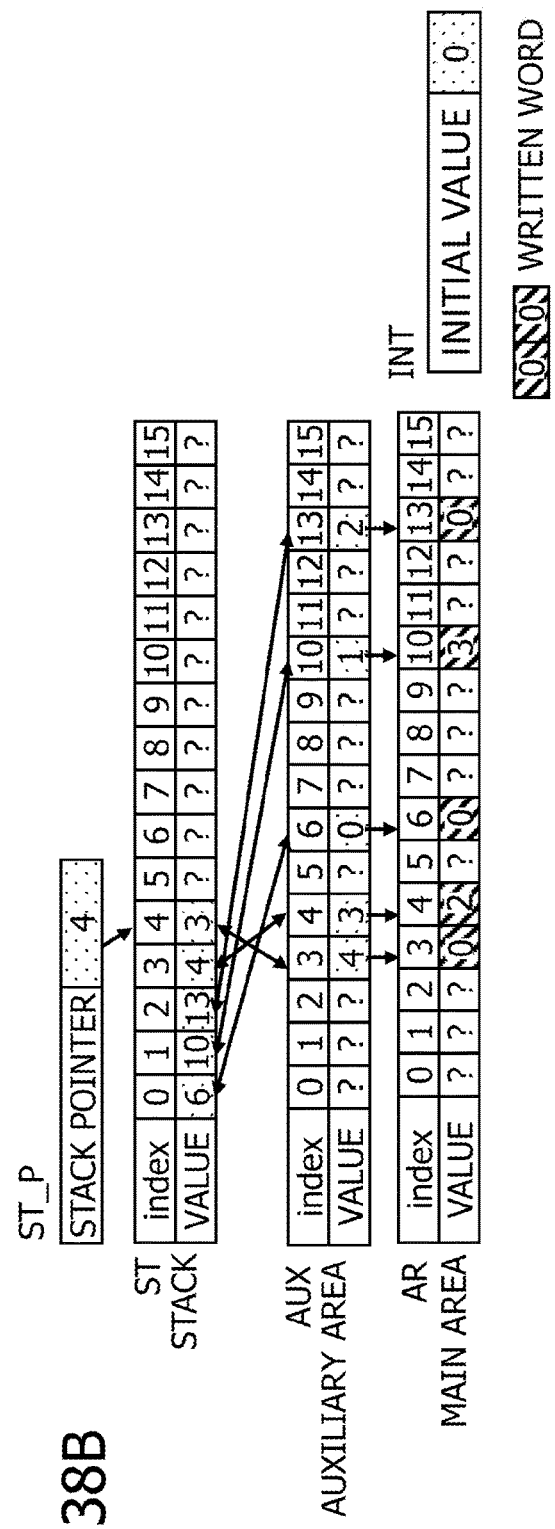
FIG. 38A
FIG. 38B

ARRAY CONTROL PROGRAM, ARRAY CONTROL METHOD, AND ARRAY CONTROL APPARATUS

CROSS-REFERENCE TO RELATED APPLICATION

This application is based upon and claims the benefit of priority of the prior Japanese Patent Application No. 2016-171852, filed on Sep. 2, 2016, the entire contents of which are incorporated herein by reference.

FIELD

The present invention relates to an array control program, an array control method, and an array control apparatus.

BACKGROUND

An array is a basic data structure used for data aggregation and the like. The array has a storage area (main area) in which values as data are stored in association with indices. When read and write are executed on indices 0≤i<N and read is executed on a certain index i, the array returns the last value written to the main area at the index i. Normal initialization of the array involves an initialization process in which an initial value is written to the main area at all the indices. This leads to the need for an initialization time proportional to an array size N.

On the other hand, in a data structure referred to as an initializable array, all the indices 0≤i<N are set to the initial value when, in addition to the above-described read and write, initialization is performed. The initializable array is configured to specially support the initialization and performs an initialization process in a given time regardless of the array size N. For example, a technique for a word random-access machine (RAM) model is known. In the technique, when initialization "initialize (x)" is invoked, an initial value x is stored. Management information is stored that indicates whether the write has been executed on each index i. When the read is invoked for an index on which no write has been executed, the initial value x stored during the initialization is returned.

Such a data structure for the initializable array is utilized, for example, when an application program that needs to operate in real time needs to execute the initialization process in a fixed time independently of the size N of the array. The data structure for the array is described in Japanese Laid-open Patent Publication Nos. H05-158783, 2002-207634, 2004-30353, and Japanese National Publication of International Patent Application No. 2009-521049, and A. Aho, J. Hoperoft, and J. Ullman, "The Design and Analysis of Computer Algorithms" Addison-Wesley, 1974, and 2 G. Navarro, "Dynamic dictionaries in constant worst-case time" Technical Report TR/DCC-2007-11, University of Chile, Department of Computer Science, October 2007.

SUMMARY

However, the conventional initializable array needs, in addition to the main area of the array, an extra space configured to store therein management information indicating whether or not the write has been executed on each index.

According to an aspect of the embodiments, a non-transitory computer readable storage medium storing therein an array control program causing a computer to execute a process of controlling an initializable array, the initializable array having an array including consecutively a plurality of blocks each having two or more of a constant number of words including at least an address word and a data word, a boundary indicative of a two-division position where the plurality of blocks of the array is divided into two divided areas and an initial value for each element of the array being stored, the boundary being a position where a ratio for the number of unwritten blocks in a first area of the two divided areas and the number of written blocks in a second area of the two divided areas is an integer ratio, the process comprising: when write to an unwritten block in the first area or an unwritten block in the second area is invoked, executing an extend process of shifting the boundary to extend the first area and generating an initialized written block in the first area; in a case where a write destination block for the write is not the same as the initialized written block generated by the extend process but is an unwritten block in the second area, executing a link process that includes storing an address of the write destination block in the second area, in the address word of the initialized written block in the first area generated by the extend process, and storing, in the address word of the write destination block in the second area, an address of the initialized written block in the first area generated by the extend process, to form a link; and writing a write value to the write destination block in the second area.

The first aspect allows suppression of the size of the extra space in which management information on the array is stored.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are flowcharts illustrating initialization and control of unlink.

FIG. 6 is a diagram illustrating the initialization process.

FIG. 17 is a diagram illustrating a write process W2-3.

FIG. 18 illustrates a specific example of the initializable array AR, and the initialization.

FIG. 21 is a diagram illustrating a specific example of the write W2-3 described for FIG. 16.

FIG. 22 is a diagram illustrating a specific example of the write W2-1 described for FIG. 16.

FIGS. 24A-24C are diagrams illustrating a specific example of three types of the read "read".

FIGS. 25A-25C are diagrams illustrating specific examples of two types of the read "read.

FIG. 29 is a comparison table for four examples in FIGS. 37 to 39 and the third embodiment.

FIGS. 38A and 38B are diagrams illustrating two examples of the initializable array.

DESCRIPTION OF EMBODIMENTS

Figure 1:
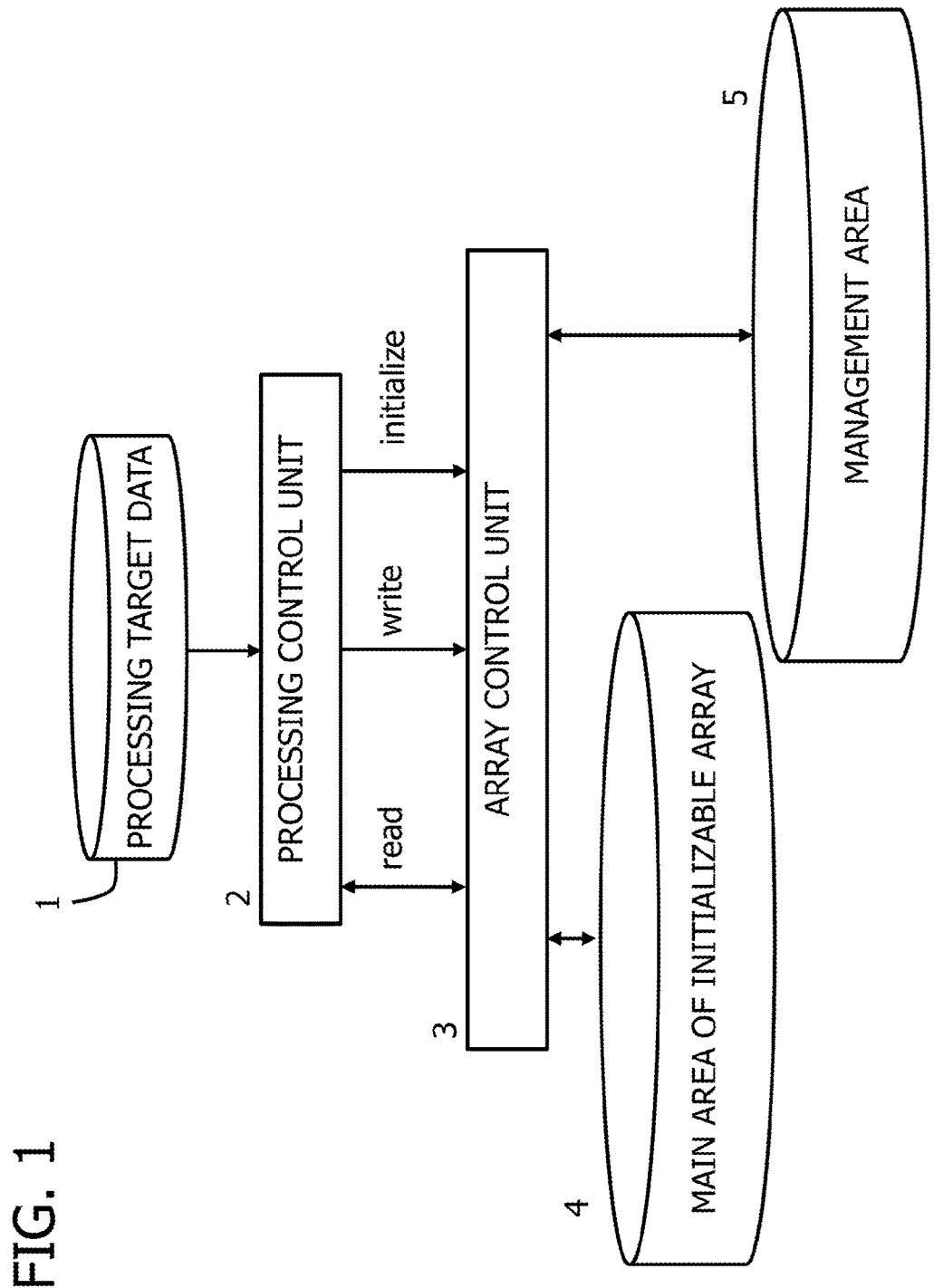
FIG. 1 is a diagram depicting an example of an initializable array and an array control program array.

FIG. 1 is a diagram depicting an example of an initializable array and an array control program. FIG. 1 illustrates control that is performed on the initializable array by the array control program. In FIG. 1, a processing control unit 2 executes a predetermined process on processing target data 1, and in conjunction with the predetermined process, executes initialization, read, and write on an initializable array 4. The array control unit 3 performs control such as an initialization process, a write process, and a read process on the initializable array. The initializable array 4 is provided with a management area 5 that stores therein management information such as the initial value for elements of the array and written (or unwritten) indices of the array.

The initializable array 4 is a storage apparatus such as a memory that stores therein data (values) on the elements of the array. The management area 5 is a storage device such as a memory which stores therein the management information such as the initial value and the written (or unwritten) index.

The processing control unit 2 is constructed by a processor in a computer executing a certain application program (hereinafter simply referred to as an application). The array control unit 3 is constructed by the processor executing the array control program.

Figure 2:
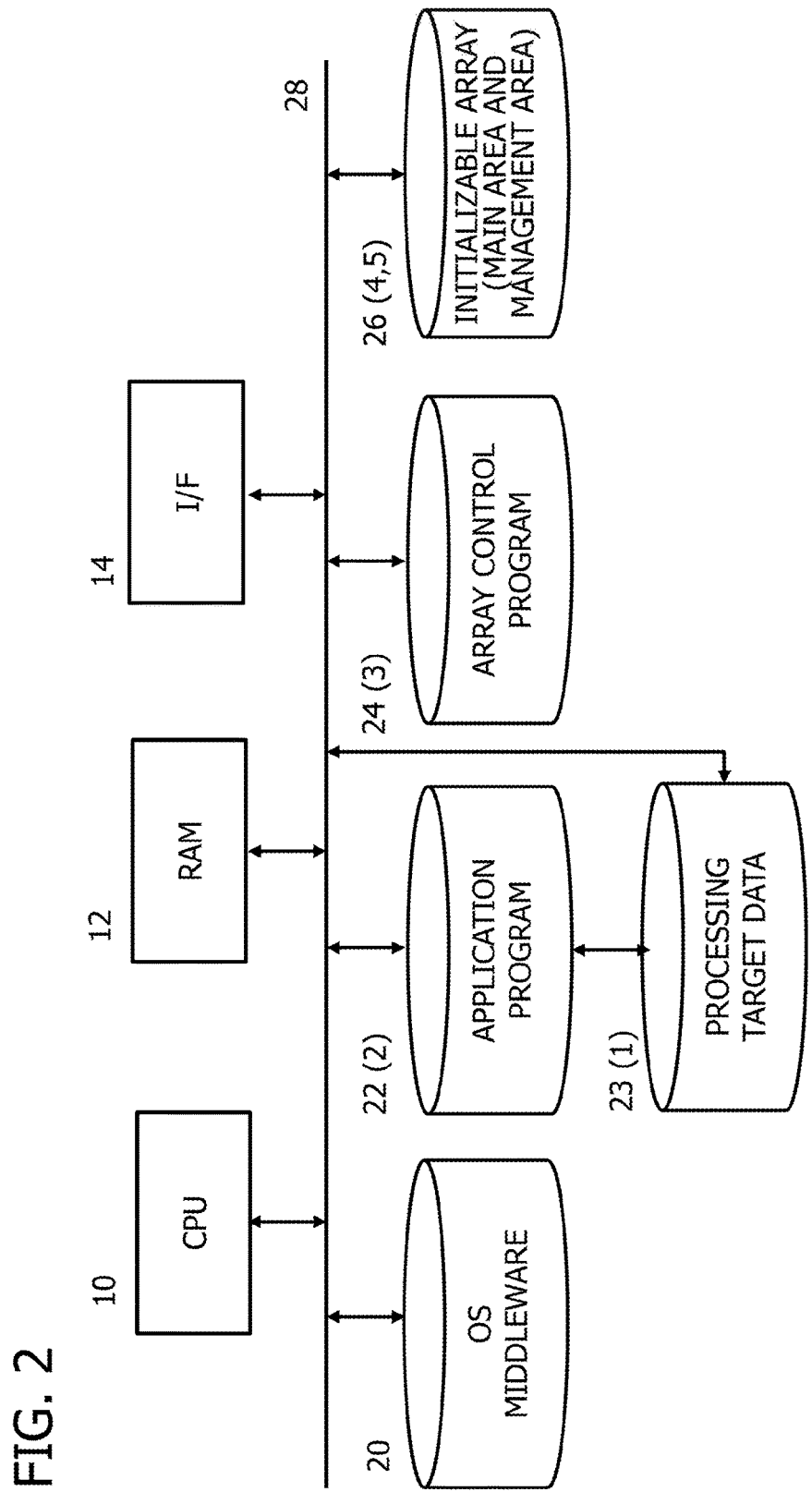
FIG. 2 is a diagram illustrating a configuration example of the array control apparatus.

FIG. 2 is a diagram illustrating a configuration example of the array control apparatus. The array control apparatus has a central processing unit (CPU) 10 that is a processor, a main memory 12 such as a random access memory (RAM) which is accessed by the CPU, and an interface 14 that interfaces with an external apparatus; the CPU 10, the main memory 12, and the interface 14 are connected together via a bus 28. The bus 28 is provided with high-capacity auxiliary storage apparatuses 20 to 26 that can be accessed by the CPU. The auxiliary storage apparatuses include a storage apparatus 20 that stores therein an operating system (OS) that is a base program and various types of middleware, and storage apparatuses that store therein an application program (hereinafter referred to as an application) 22, processing target data 23, and an array control program 24, respectively. The CPU executes the array control program 24 such that the application 22 executes an initialization process, a write process, or a read process on the initializable array stored in the storage apparatus 26. The storage apparatus 26 stores therein not only a main area for the initializable array but also the management area in which management data on the initializable array is stored.

Now, the initializable array will be described based on an example. An array has a main area including a plurality of elements that stores data therein in association with indices. "Initialization" of the array means initialization of all the elements to an initial value. "Write" to the array means that the initialized elements are overwritten with write values. "Unwritten" means that the elements remain in an initialized state and have not been overwritten with the write values yet.

Figure 37:
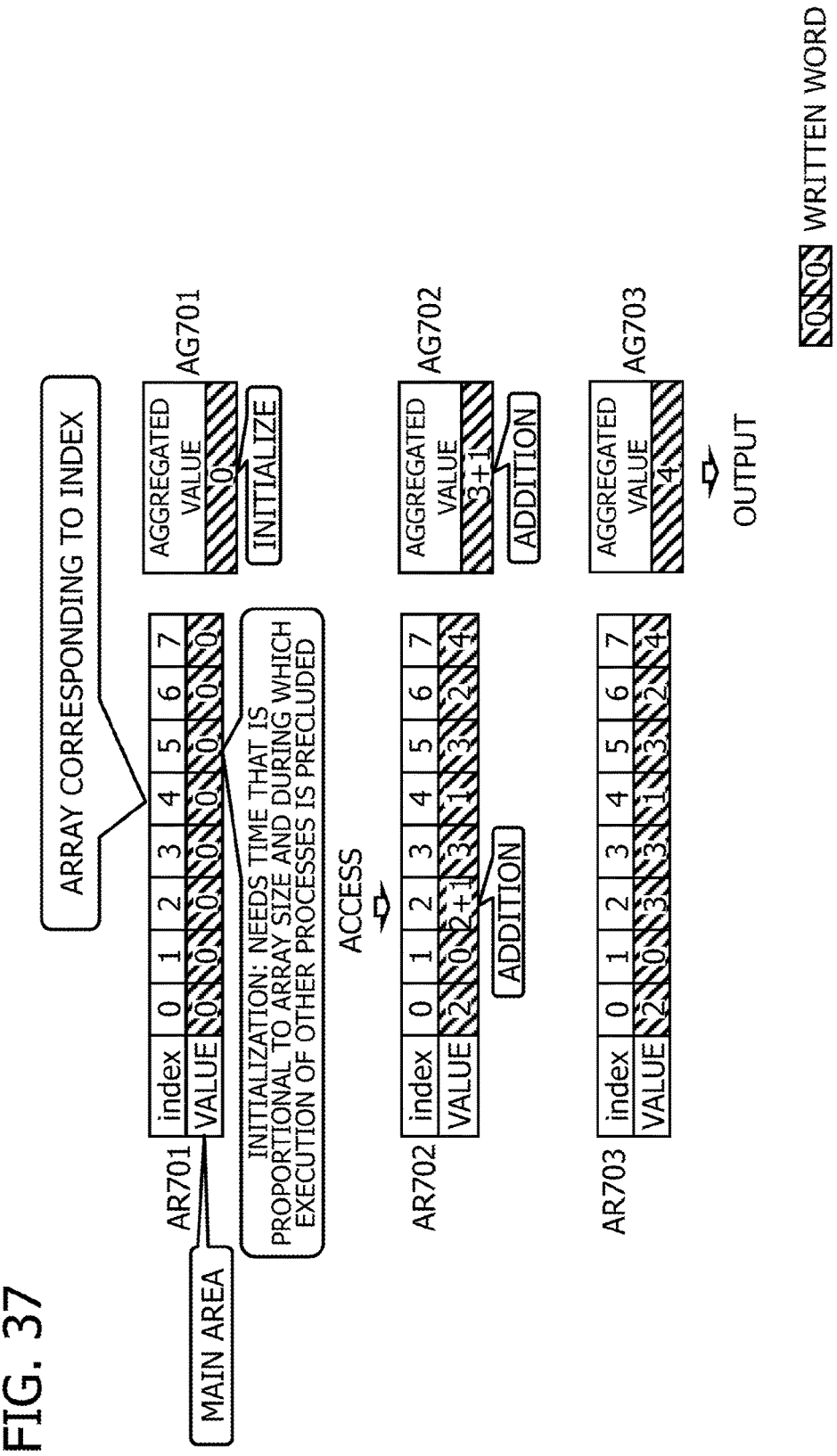
FIG. 37 is a diagram illustrating a first example.

FIG. 37 is a diagram illustrating a first example. An array AR has a main area including a plurality of elements that stores data (values) therein in association with indices. The array AR in FIG. 37 has, in the main area, eight elements corresponding to indices 0 to 7, respectively. In addition to the main area, the array AR has an aggregated value area AG in which a certain aggregated value is stored. For example, a processor is assumed to execute an application to aggregate, for eight users, the number of users who have accessed a server three or more times a day, in real time. In other words, the indices 0 to 7 in the array AR correspond to the eight users, and the number of accesses by each user is written to the corresponding element. The number of users with three or more accesses is stored in the aggregated value area AG as an aggregated value.

An array AR701 illustrates an initialized state. That is, in response to invocation for the initialization process by the application, the processor executes the array control program to write an initial value 0 (0 access) to all the elements of the array AR701, while writing an initial value 0 (0 people) to an aggregated value area AG701. In an array AR702, when a user corresponding to an index 2 gains access, the application adds one to the value "2" for the element with the index 2 and writes "3" to the element. At the same time, 1 is added to the value "3" in the aggregated value area AG701, and "4" is written to the element. Finally, at any requested timing, the application reads the value "4" in an aggregated value area AG703 corresponding to an array AR703. Then, at a predetermined timing each day, the array is initialized. The processor executes, based on the array control program, the initialization process and the read and write processes for the value for the element of the array as described above.

In the example in FIG. 37, in the initialization process, the initial value "0" needs to be written to all the indices. Therefore, the initialization process needs a time O (N) proportional to an array size N, precluding the write and read from being executed on the array during the initialization process. On the other hand, the read and write can be executed in a constant time O (1). The array in FIG. 37 is unsuitable for applications that record the number of accesses to the server in real time. The character "O" is the initial of order.

FIGS. 38A and 38B are diagrams illustrating two examples of the initializable array. The initializable array is a data structure that can be initialized at a high speed. Functions supported by the initializable array are as follows.
(1) For read "read(i)", a value for an element with an index i is returned.
(2) For write "write(i, x)", x is written to the element with the index i.
(3) For initialization "initialize(x)", x is written to elements with all the indices 0≤i<N.

Then, the processor executes the array control program, and when the initialization "initialize(x)" is invoked, simply stores therein the initial value x instead of writing the initial value x to all the elements in the array. The processor further stores therein management information indicating whether or not the write has been executed on each index. If the read "read(i)" for an index i to which no write has been executed is invoked, the processor returns the initial value x stored during the initialization. Consequently, the initialization is performed in a fixed time independently of the size N of the array.

In FIG. 38A, an array AR with N=16 elements with indices 0 to 15 is divided into blocks 0 to 3 each with four elements. The array AR has, as an management area, a bit map BT_MP that distinguishes between an unwritten state and a written state of each block and an initial value area INT in which an initial value for all the elements of the array is stored. When the processor executes the array control program and the initialization is invoked, the initial value "0" is written to the initial value area INT, and "0" is written to the bit map block. The initialization does not involve execution of write of the initial value to all the indices. When the write is invoked, a write value is written to a write destination index in the block, the initial value "0" is written to the remaining indices in the same block, and "1" indicative of the written state is written to a corresponding block in the bit map. The bit map stores therein "1" for written blocks and "0" for unwritten blocks so as to store therein management information on the written blocks and the unwritten blocks.

The array in FIG. 38A allows the initialization to be completed in a time O (N/log N) that is shorter than the time for the array in FIG. 37. However, the array in FIG. 38A needs to initialize the bit map BT_MP and thus needs, for the initialization, a time o (N) that depends on the array size N. The time o (N)=0 (N/log N) means a time shorter than the time O (N), and log means a base 2 binary logarithm. However, since the management information includes the initial value area INT and the bit map BT_MP, an extra space for O (N/log N)=o (N) is needed for management. In other words, the bit map has elements for the respective blocks and thus needs the area o (N), which is smaller than the area O (N), which depends on the array size N.

The array in FIG. 38B has, in addition to an array AR with N=16 elements with indices 0 to 15, an auxiliary area AUX, a stack area ST, a stack pointer area ST_P, and an initial value area INT in which management information is stored. The auxiliary area and the stack area each have 16 elements. In this array, when the processor executing the array control program carries out write on certain indices in the array AR, the processor writes to the element in the auxiliary area that have the same indices as the write and to the minimum unwritten elements in the stack area the indices vice versa to generate bidirectional links. Concurrently with the generation of bidirectional links, a stack pointer is updated to the index of the maximum write element.

In the example in FIG. 38B, in the array AR, write is executed on five elements with the five respective indices, and bidirectional links are generated between elements in the auxiliary area AUX that have the same five indices and elements in the stack area. For example, a value "0" is written to an index 3 in the array, and an index "3" in the auxiliary area is written to an index 4 in the stack area corresponding to a value "4" of an index 3 in the auxiliary area, which index is the same as the corresponding index in the array. Thus, bidirectional links are generated between the auxiliary area and the stack area. The value "4" of the stack pointer points to the maximum index of a set of indices in the stack area for which bidirectional links are generated.

When the read is invoked, the processor returns the value of a read destination index i in the array if the element in the auxiliary area that has the read destination index i forms bidirectional links, and otherwise returns the value in the initial value area INT.

For the array, when the initialization is invoked, the initial value "0" is written to the initial value area INT, and the minimum index "0" is written to the stack pointer ST_P. Therefore, the time needed for the initialization is the constant time O (1) independently of the array size N. However, the management area needs to be approximately 200% of the main area of the array, and the extra space corresponds to the O (N) that depends on the array size N.

Figure 39:
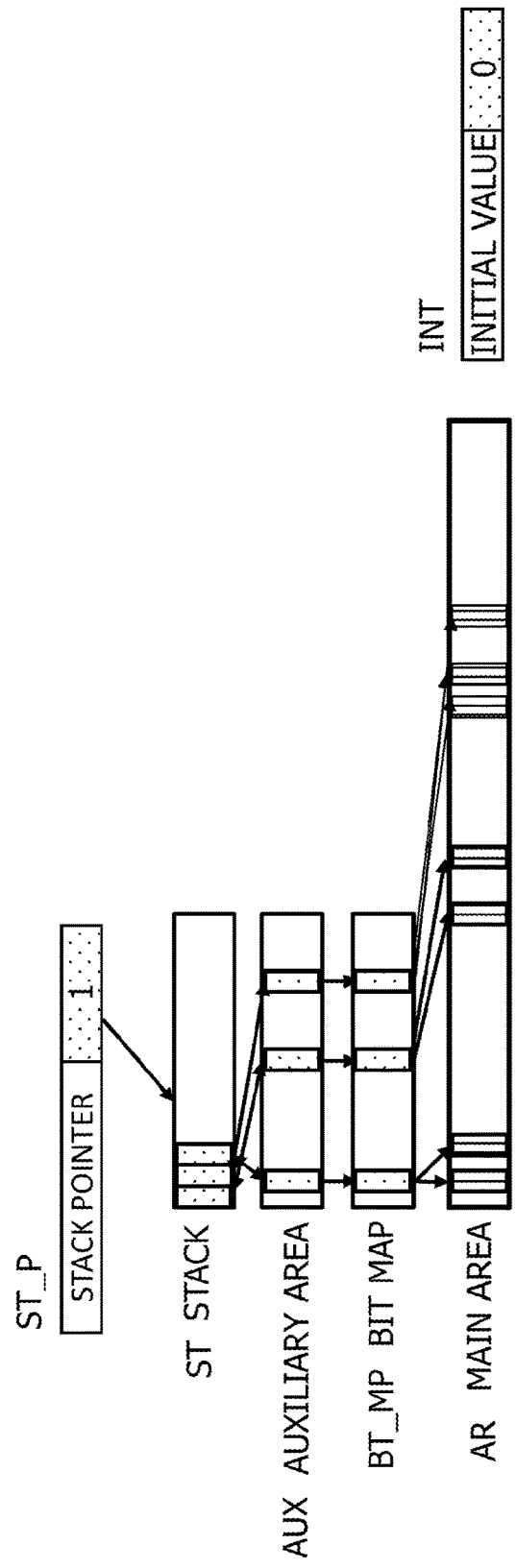
FIG. 39 illustrates an example of an array corresponding to hybridized two arrays in FIGS. 38A and 38B.

FIG. 39 illustrates an example of an array corresponding to hybridized two arrays in FIGS. 38A and 38B. In FIG. 39, a main area of an array AR and a bit map BT_MP similar to the main area and the bit map BT_MP in FIG. 38A are provided. For the bit map, an auxiliary area AUX, a stack ST, and a stack pointer ST_P similar to the auxiliary area AUX, stack ST, and stack pointer ST_P in FIG. 38B are provided. The bit map is smaller in size than the main area of the array AR, and thus correspondingly allows the management area to be reduced in size.

In this example, initialization can be performed in the constant time O (1). On the other hand, the management area in which management information is stored needs an extra space O (N/log N)=o (N). In general, the extra space is three times larger than the extra space needed for the bit map method in FIG. 38A.

FIG. 37, FIG. 38A, FIG. 38B, and FIG. 39 are summarized. For the array in FIG. 37, the initialization time depends on the array size N (O (N)), but the extra space for management has the constant size (O (1)). For the array in FIG. 38A, the initialization time is shorter than the time that depends on the array size N (O (N/log N)=o (N)), and this also applies to the extra space for management (O (N/log N)=o (N)). For the array in FIG. 38B, the initialization time is the constant time (O (1)), but the extra space for management has a size that depends on the array size N (O (N)).

For the array in FIG. 39, the initialization time is the constant time (O (1)), and the extra space for management is smaller than the size that depends on the array size (O (N/log N)=o (N)).

For an array in the present embodiment described below, the initialization time is a constant time, and the extra space for management is a constant area.

Initializable Array in the First Embodiment

Figure 3:
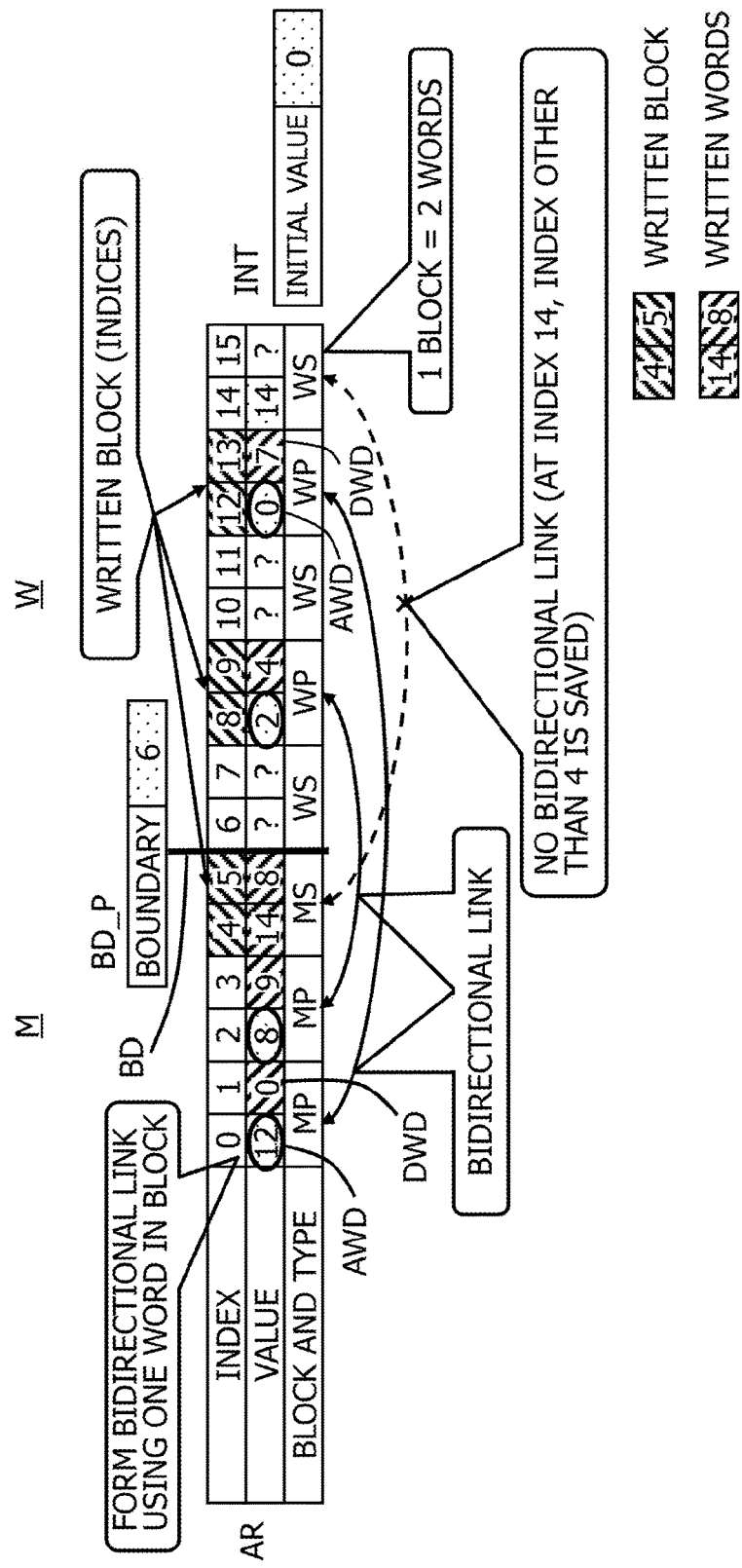
FIG. 3 is a diagram illustrating an initializable array in the present embodiment.

FIG. 3 is a diagram illustrating an initializable array in the present embodiment. For the initializable array, the read and write are executed in a constant time that does not depend on the array size, and the initialization is also performed in a constant time. The extra space for management also has a constant size that does not depend on the array size.

An array AR in FIG. 3 has N (=16) elements with indices $0 \le i < 16$, which consecutively form a plurality of (in the example in FIG. 3, eight) blocks each having two or more, a constant number of (in the example in FIG. 3, two) words (corresponding to the elements of the main area) including an address word and a data word.

In the example in FIG. 3, each block includes two elements (words) (one block includes two words). An element in the block that has the minimum index is an address word to which a link destination index for each bidirectional link described below is written, and the other element with the corresponding index is a data word to which a value is written. However, data is also written to the address word.

The element to which a value is written is referred to as a word because the value written to the element is a word with 32 bits, 64 bits, or the like.

A boundary pointer BD_P is also provided that stores therein a boundary BD indicative of a two-division position for the plurality of blocks of the array, and an initial value area INT is further provided in which the initial value for the elements is stored. An index "6" to the right of the boundary BD is written to the boundary pointer BD_P. An initial value "0" is written to the initial value area INT by way of example.

A first area that is a left one of two areas into which the array is divided at the boundary is referred to as an M area, and the number of unwritten blocks in the M area is stored. A second area that is a right area is referred to as a W area, and the number of written blocks in the W area is stored. A division method is to selectively position a boundary BD such that the number of unwritten blocks in the M area (hereinafter referred to as MPs) is the same as the number of written blocks in the W area (hereinafter referred to as WPs). The boundary is uniquely determined.

The unwritten blocks MP in the M area are associated with the written blocks WP in the W area on a one-to-one basis. The one-to-one association is performed by forming bidirectional links between the blocks MP and WP. In FIG. 3, the bidirectional links are depicted by solid arrows.

Specifically, for unwritten blocks MP with indices 0, 1 and written blocks WP with indices 12, 13, the index "12" of the written block WP is written to an address word AWD of the unwritten block MP (the element with the index 0). The index "0" of the unwritten block MP is written to an address word AWD of the written block WP (the element with the index 12). Bidirectional links are also formed for the block MP with the indices 2, 3 and the block WP with the indices 8, 9. The boundary BD is managed so that the number of unwritten blocks MP in the M area is the same as the number of written blocks WP in the W area, and bidirectional links are formed between the blocks MPs and the blocks WPs. Thus, the unwritten blocks MP in the M area and the written blocks WP in the W area are stored as management information by storing the boundary BD and the bidirectional links, and the number of unwritten blocks MP and the number of written blocks WP are managed so as to be the same.

Formation of the bidirectional links precludes a value from being written to the address word AWD of the written block WP in the W area (the element with the index 12). Thus, a value is written to a data word DWD of the unwritten block MP (the element with the index 1) in the M area to which the written block WP in the W area is linked. This will be described below in detail.

On the other hand, the indices of the written blocks MS in the M area are controllably inhibited from being stored in the address words of the blocks in the W area so as to prevent the written blocks MS in the M area from being associated with the unwritten blocks WS in the W area on a one-to-one basis, in other words, so as to preclude formation of the above-described bidirectional links.

Specifically, "14" is written to the address word of the written block MS with the indices 4, 5, and thus, a one-directional link is formed for the block with the indices 14, 15. Thus, the indices "4" of the M area are inhibited from being stored in the address word of the block with the indices 14, 15. In the example in FIG. 3, in the address word of the block with the indices 14, 15, the index "14" of the block is written. The block WS with indices 6, 7 and the block WS with indices 10, 11 are unwritten blocks. The values stored in the blocks are not referenced during the read (in FIG. 3, this is represented by ?), and the value "0" in the initial value area INT is read.

For the types of the blocks, blocks with association are referred to as P (Pair) blocks, whereas blocks with no association are referred to as S (Single) blocks. Therefore, P blocks and S blocks may be present in each of the M area and the W area. Thus, the following four types of blocks are available.

M area
MP: unwritten blocks, bidirectional links are formed between the MPs and WPs
MS: written blocks, no bidirectional links are formed between the MSs and the blocks in the W area
W area
WP: written blocks, bidirectional links are formed between the WPs and the MPs
WS: unwritten blocks, no bidirectional links are formed between the WSs and the blocks in the M area The array AR has the main area including a plurality of elements that stores data therein in association with indices, like the array in FIG. 37. The array AR does not have area for storing the types of blocks, MP, MS, WP and WS. However, the types of blocks can be identified by checking whether the blocks have the bidirectional link according to the information in the address words or not and whether the blocks are in each M area or W area according to the boundary.

Figure 4:
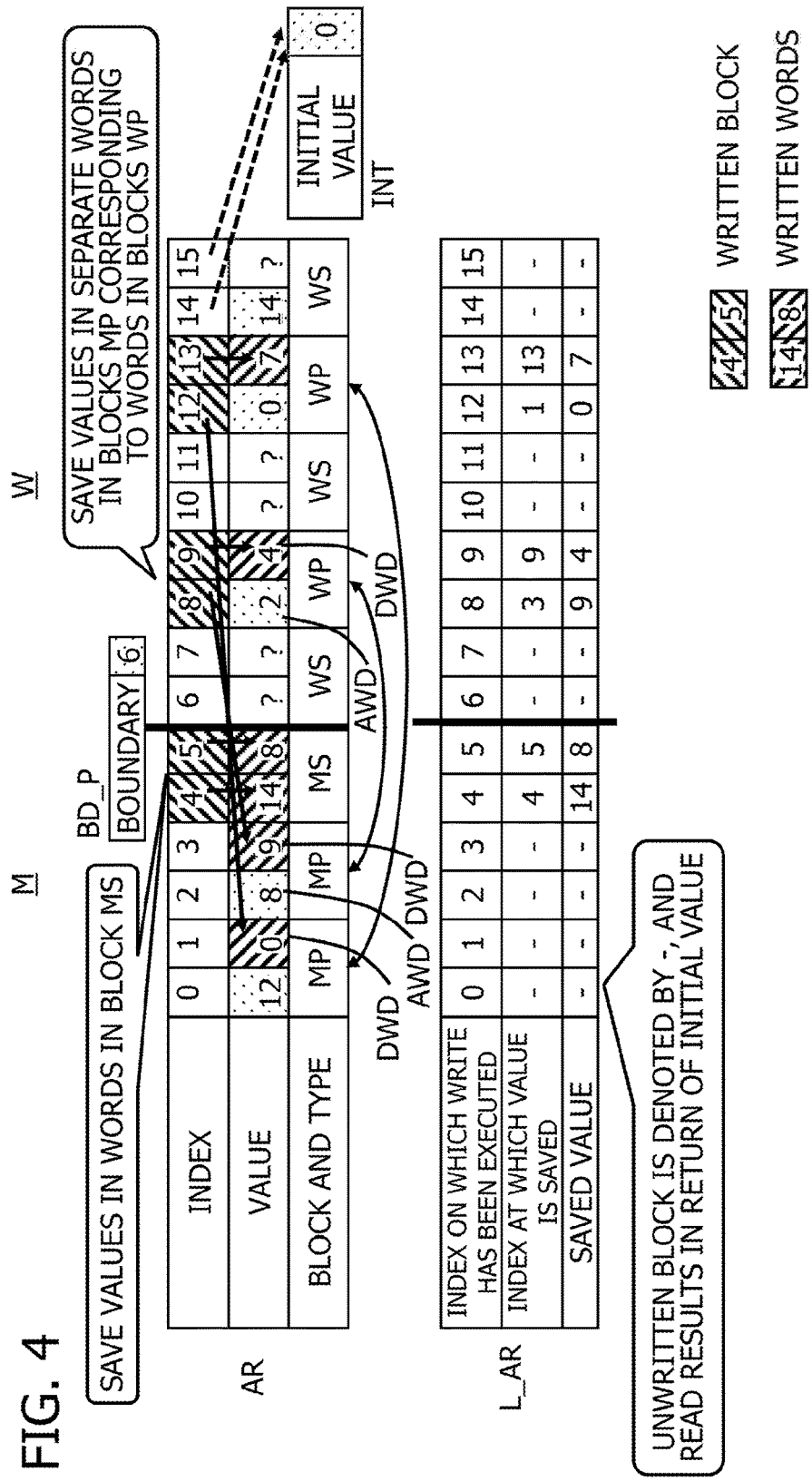
FIG. 4 is a diagram illustrating where the values in the array in FIG. 3 are saved.

FIG. 4 is a diagram illustrating where the values in the array in FIG. 3 are saved. An array AR in FIG. 4 is the same as the array AR in FIG. 3. First, for the written block MS in the M area, values are saved in the two words of the block. An example is the block MS with the indices 4, 5.

Then, for a written block WP in the W area, a value is saved in the data word DWD of the block WP and a value is also saved in the data word DWD of an unwritten block MP in the M area having a bidirectional link with the block WR In other words, in order to form a bidirectional link between the unwritten block MP in the M area and the written block WP in the W area, link destination indices are written to the address words AWD. Therefore, the values are saved in the words different from the address words AWD. For example, the value "9" saved at an index 8 of the block WP is saved in the data word DWD of the index 3 of the link destination block MP. The value "0" saved at the index 12 of the block WP is saved in the data word DWD of the index 1 of the link destination block MR The minimum index of one block is the address word, and the remaining index is the data word DWD. When the number of words (=b) in one block is b≥2, two words of the 2*b−2 words in a pair of the associated blocks are used as address words, and 2*b−2 words are used as data words.

Finally, the unwritten blocks MP, WS are assumed to store the initial value therein, and the value is saved in the initial value area INT, with no write values saved in the words of the blocks MP, MS. For example, the value for the block WS with the indices 14, 15 is the value "0" in the initial value area INT.

FIG. 4 illustrates a logical array L_AR in which saved indices and values are logically represented in association with an actual array AR in which actually saved values are depicted. The logical array L_AR indicates that values "9" and "0" written to the indices 8, 12 are saved to indices 3, 1, respectively.

The initializable array in FIG. 3 have the following features.

(1) In the main area of the array in which no write has been executed yet, the management information (bidirectional links) is saved that distinguishes between the written areas (blocks WP) and the unwritten areas (blocks MP). Thus, the extra space for management stores the boundary pointer BD_P and the initial value area INT, but does not store written or not written indices, like FIGS. 38A, 38B. Therefore, the extra space for management has a size O (log N) that is smaller than the order that depends on the array size N or a fixed size O (1) as in an embodiment described below.

(2) When the indices of the written areas are stored, as the management information that distinguishes between the written areas and unwritten areas, in the main area of the array, the number of the unwritten areas in the array decreases with progression of the write. This results in the lack of the area in which the management information can be saved. On the other hand, when the unwritten areas are stored, as the management information, in the main area of the array, the initialization process needs to set all the areas in the array to the unwritten state and thus needs the amount of time that depends on the array size, precluding the initialization process from being completed in the constant time. Thus, the storage of the written areas and the storage of the unwritten areas are hybridized. That is, the main area of the array is divided into the M area where the unwritten areas are managed and the W area where the written areas are managed. During the initialization, the size of the M area is set to 0 such that the size of the W area decreases and the size of the M area increases with progression of the write. Consequently, the initialization time is completed in the constant time (the boundary pointer is set to the index 0 and the initial value x is written to the initial value area INT). And the number of the written areas WP in the W area to be managed is controllably reduced so as to decrease the amount of management information (the number of bidirectional links) with progression of the write. Furthermore, during the write, the management information (boundary BD and bidirectional links) is changed.

(3) The management information is saved in the unwritten areas in the array. However, since a user determines where to write the data and where not to write the data, the unwritten areas are fragmented. Thus, the main area of the array is managed in units of blocks each having the address word and the data word. The address words of the pair of blocks are utilized to store a bidirectional link for saving the management information. A part of user data is saved in the data word in the block of the bidirectional link destination.

[Array Control Program]

Now, control methods for the following processes of the array control program executed by the processor will be described: , (1) "initialize(x)"; the initialization of the initializable array using the initial value x, (2) "read(i)"; the read the index i, (3) "write(i, x)"; the write the write value x to the index i, (4) "unlink(i)"; unlink a block with the index i that is an auxiliary function to implement a write function, (5) "extend( )"; extend the M area by shifting the boundary BD.

First, the processor executes the array control program to perform the initialization process described below when the initialization "initialize(x)" is invoked, read and return the value of the index i when the read "read(i)" is invoked, and write the value x to the index i when the write "write(i, x)" is invoked.

["initialize(x)"; Initialization Using the Initial Value x]

FIGS. 5A and 5B are flowcharts illustrating control of initialization and unlink. FIG. 6 is a diagram illustrating the initialization process. When the initialization "initialize(x)" is invoked, the processor executing the array control program saves the initial value x in the initial value area INT (S1), and saves the index 0 at the boundary pointer BD_P to shift the boundary to a left end for initializing the boundary (S2). The index to the right of the boundary is saved at the boundary pointer BD_P. As a result of the initialization of the boundary, all of the main area of the array AR is the W area, no bidirectional links are present, and the W area includes only the unwritten blocks WS. The unlink in FIGS. 5A and 5B will be described later.

["read(i)"; Read the Index i]

Figure 7:
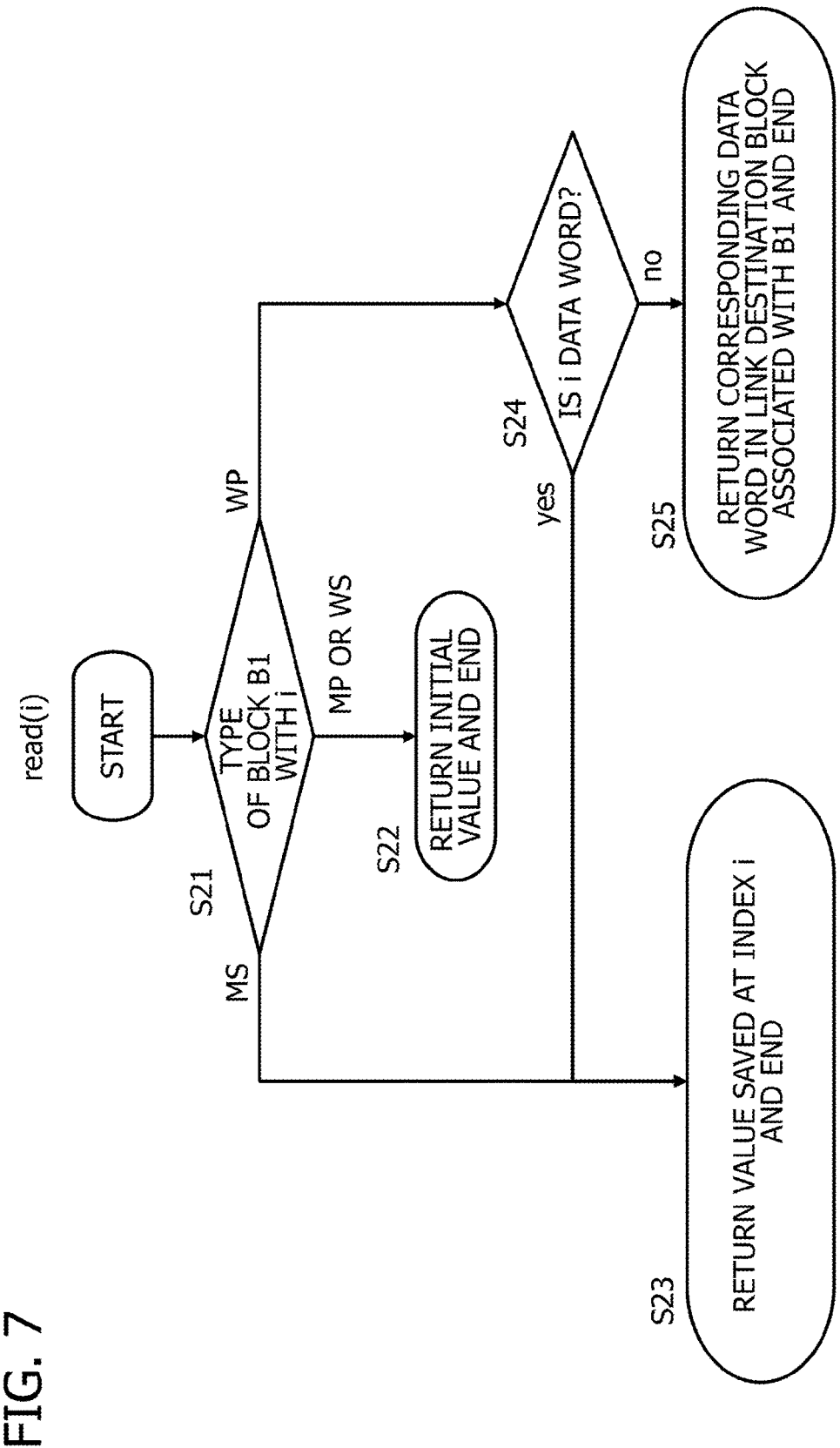
FIG. 7 is a flowchart illustrating control of read.
Figure 8:
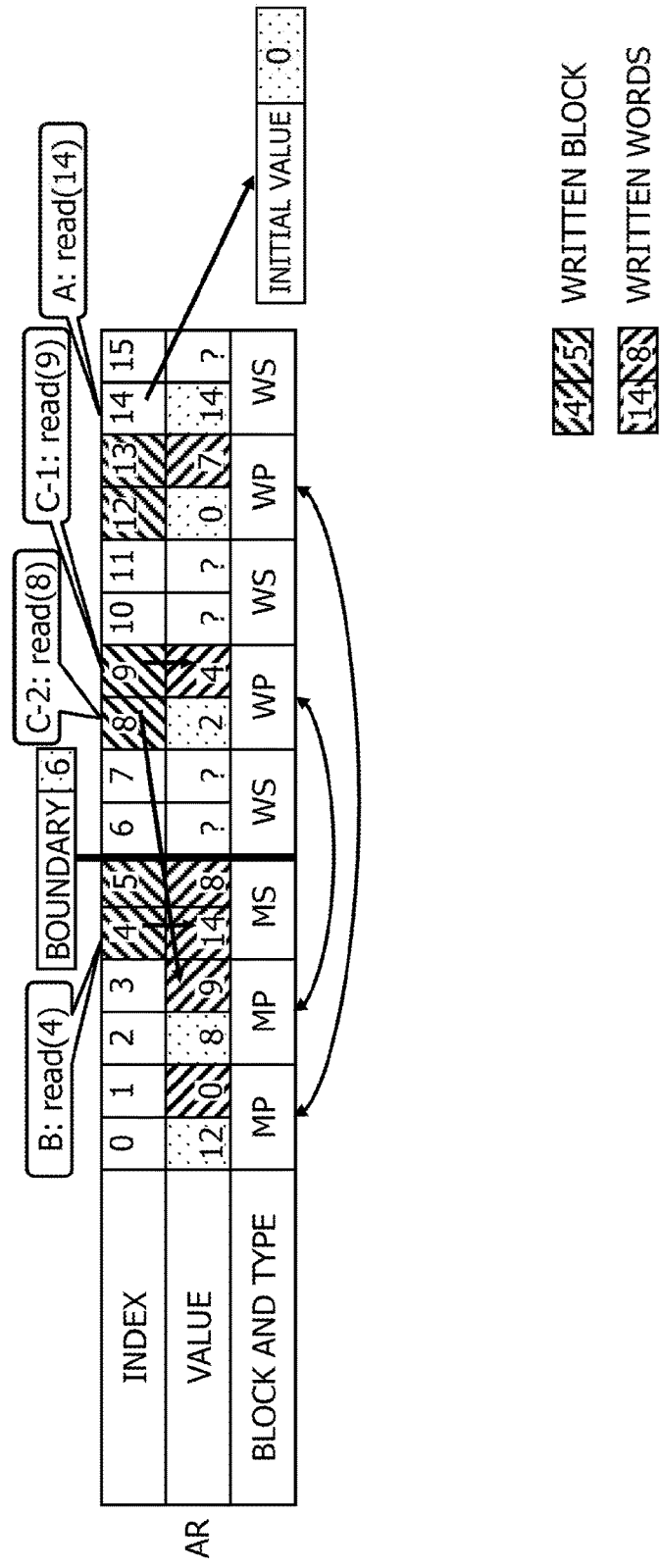
FIG. 8 is a diagram illustrating read control.

FIG. 7 is a flowchart illustrating control of read. FIG. 8 is a diagram illustrating read control. In this case, a block with a read destination index i is designated as B1.

When the read "read(i)" is invoked, the processor executing the array control program checks the type of the block B1 with the index i (S21). Determination of the type of the block depends on whether the index i is smaller than the boundary pointer (M area) or equal to or larger than the boundary pointer (W area) and whether or not the block with the index i has any bidirectional link (MP, WP if the block has a bidirectional link and otherwise MS, WS). If the type of the block B1 with the index i is the unwritten block MP in the M area or the unwritten block WS in the W area (MP or WS in S21), the processor returns the initial value in the initial value area INT and ends the process (S22). An example is A: read(14) in FIG. 8.

If the type of the block B1 with the index i is the written block MS in the M area (MS in S21), the processor returns the value saved at the index i and ends the process (S23). An example is B:read(4) in FIG. 8.

If the type of the block B1 with the index i is the written block WP in the W area (WP in S21) and the index i is a data word (YES in S24), the processor returns the value saved at the index i and ends the process (S23). An example is c-1:read(9) in FIG. 8. In contrast, if the index i is an address word (NO in S24), the processor returns the value saved in the corresponding data word in the block MP associated with the block B1 (the block MP having a bidirectional link with the block B1) and ends the process (S25). An example is c-2:read(8) in FIG. 8. In the example in FIG. 8, each block has only one data word, and thus, the processor returns the data word at the index 3 in the block MP with the index 2. If one block has a plurality of data words, a value to be written to the address word of the block with a bidirectional link destination is saved in a predetermined data word of the block with the bidirectional link source.

Then, when the write "write(i, x)" is invoked, the unlink "unlink(i)" and the extend "extend( )" that shifts the boundary, both of which will be described below, are invoked as needed and a process of writing the value x to the index i is executed. The extend "extend" includes two types of "extend" processes E1, E2. The write "write" includes four types of write processes W1, W2-1, W2-2, W2-3. In each process, an unlink "unlink" process is executed in which for the blocks in the M area provided with unintended links, the links are removed so as to make the blocks MS block. Therefore, the extend "extend" and the unlink "unlink" are auxiliary functions for the write.

[Unlink "unlink(i)" of the Block with the Index i]

Figure 9:
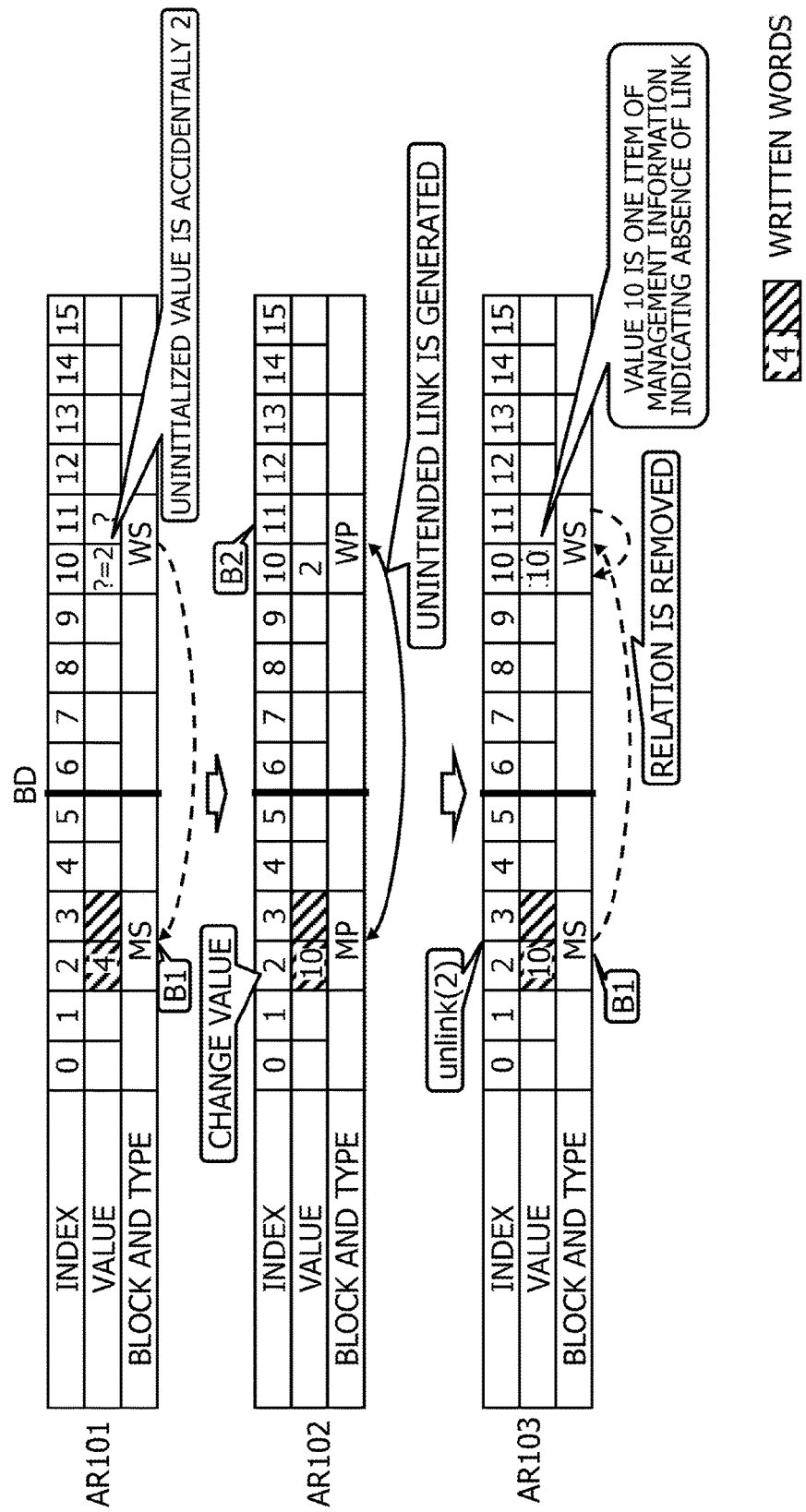
FIG. 9 is a diagram illustrating the control of the unlink.

FIGS. 5A and 5B are flowcharts illustrating control of the unlink. FIG. 9 is a diagram illustrating the control of the unlink. When the value for the MS type block is changed, if a bidirectional link with the block in the W area is accidentally formed, then the unlink "unlink" is used, for example, to remove the unintended link to maintain the MS type. The unlink is performed by replacing the address word of the block in the W area provided with the accidentally generated bidirectional link, with its own index, i.e. the index of the block in the W area provided with the accidentally generated bidirectional link.

When the unlink "unlink" is invoked, the processor executing the array control program checks whether a block B2 in the W area is present that has a bidirectional link with the block B1 in the M area that has the index i (S11). If such a block B2 is present, the processor replaces the address word of the block B2 in the W area with the index of a block other than the blocks in the M area (S12). Specifically, for example, the address word of the block B2 in the W area is replaced with the index of the block B2 in the W area.

In a specific example in FIG. 9, the block B1 in the array AR101 is assumed to be a written block MS in the M area, whereas "2" is assumed to be accidentally saved in the address word of the unwritten block WS (B2) in the W area. In the array AR102, when the value "10" is written to the index 2, an unintended bidirectional link is generated between the written block B1 in the M area and the unwritten block B2 in the W area. Thus, the unlink "unlink(2)" is invoked to write the index "10" of the block B2 in the W area to the address word of the block B2 in the W area to remove the unintended link. Any index of the W area may be written to unlink. However, the own index of the block B2 may be written as described above.

["extend( )"; Extend]

The extend "extend" is a process in which, when the write is executed on an unwritten block MP or WS, the initial value is written to one of the unwritten blocks to generate an initialized MS type block, which is then returned. In the write "write" process, the write is executed on the initialized block MS or the position of the initialized block MS is substantially shifted to the user's write destination so that write can be executed on the initialized block. The one block has two or more words, and the write is executed on one of the words. Therefore, an initialized block MS with the initial value prewritten to all the words is acquired by the extend process, and a write value is written to one of the words of the initialized block MS (or the write value is written to one of the words of the shifted initialized block).

In other words, when the write is executed on the unwritten block MP or WS, the number of unwritten blocks MP or WS is reduced by one, while the number of written blocks MS or WP is increased by one naturally. Thus, the extend "extend" process is executed for keeping the number of the blocks MS in the M area equal to the number of the blocks WP in the W area.

Figure 10:
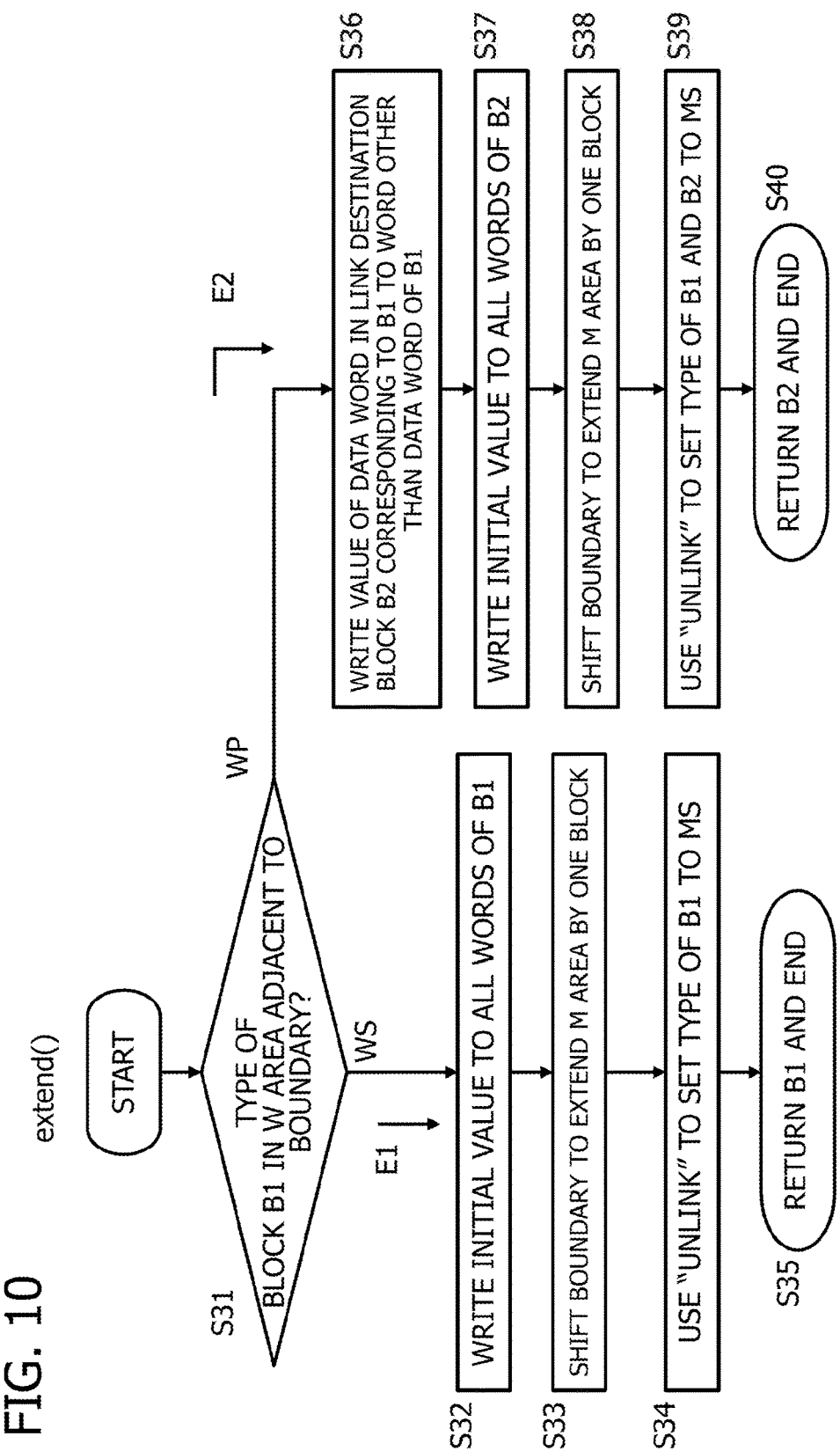
FIG. 10 is a flowchart of control of the extend "extend( )"
Figure 11:
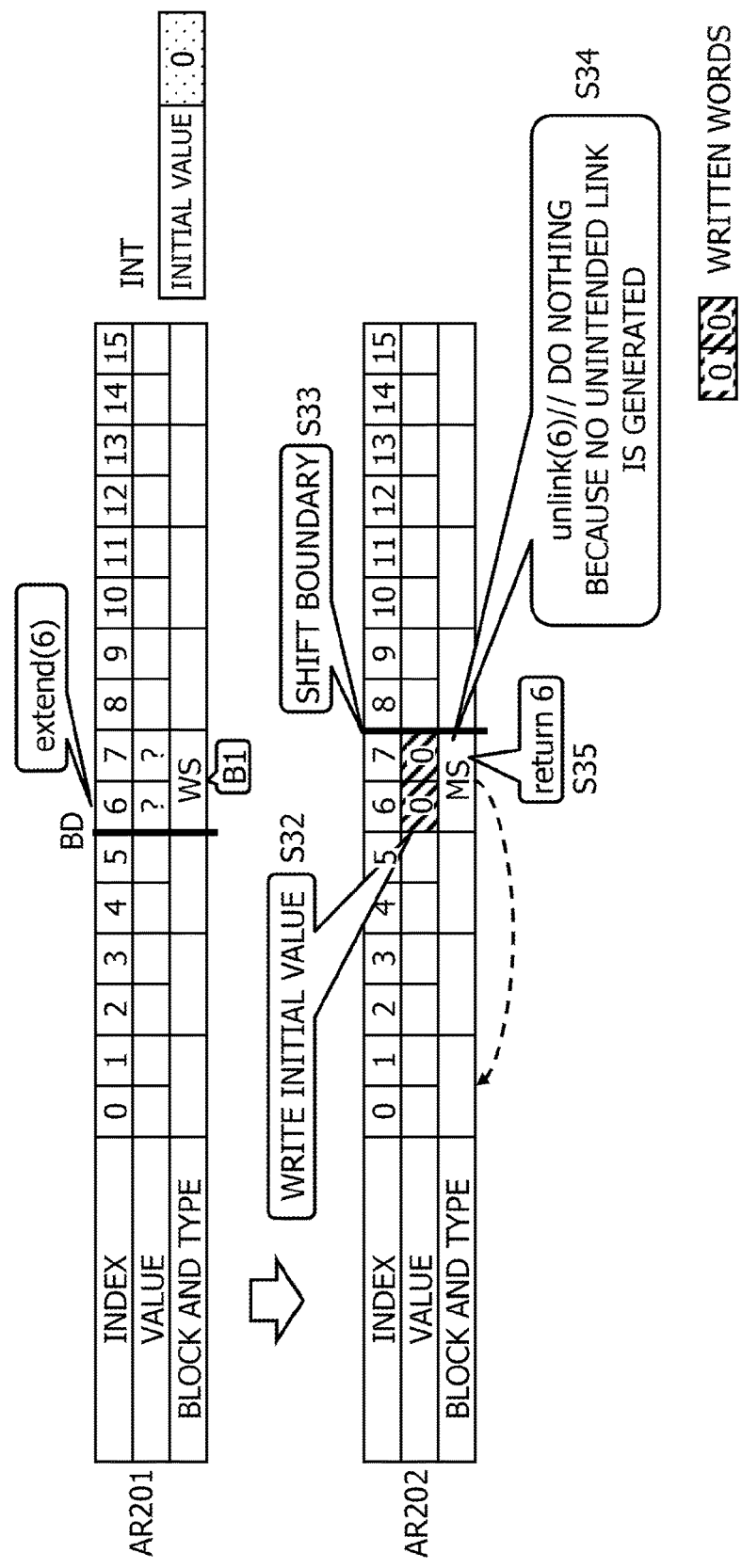
FIG. 11 is a diagram of extend control E1 performed when the block B1 in the W area that is adjacent to the boundary is of the WS type.
Figure 12:
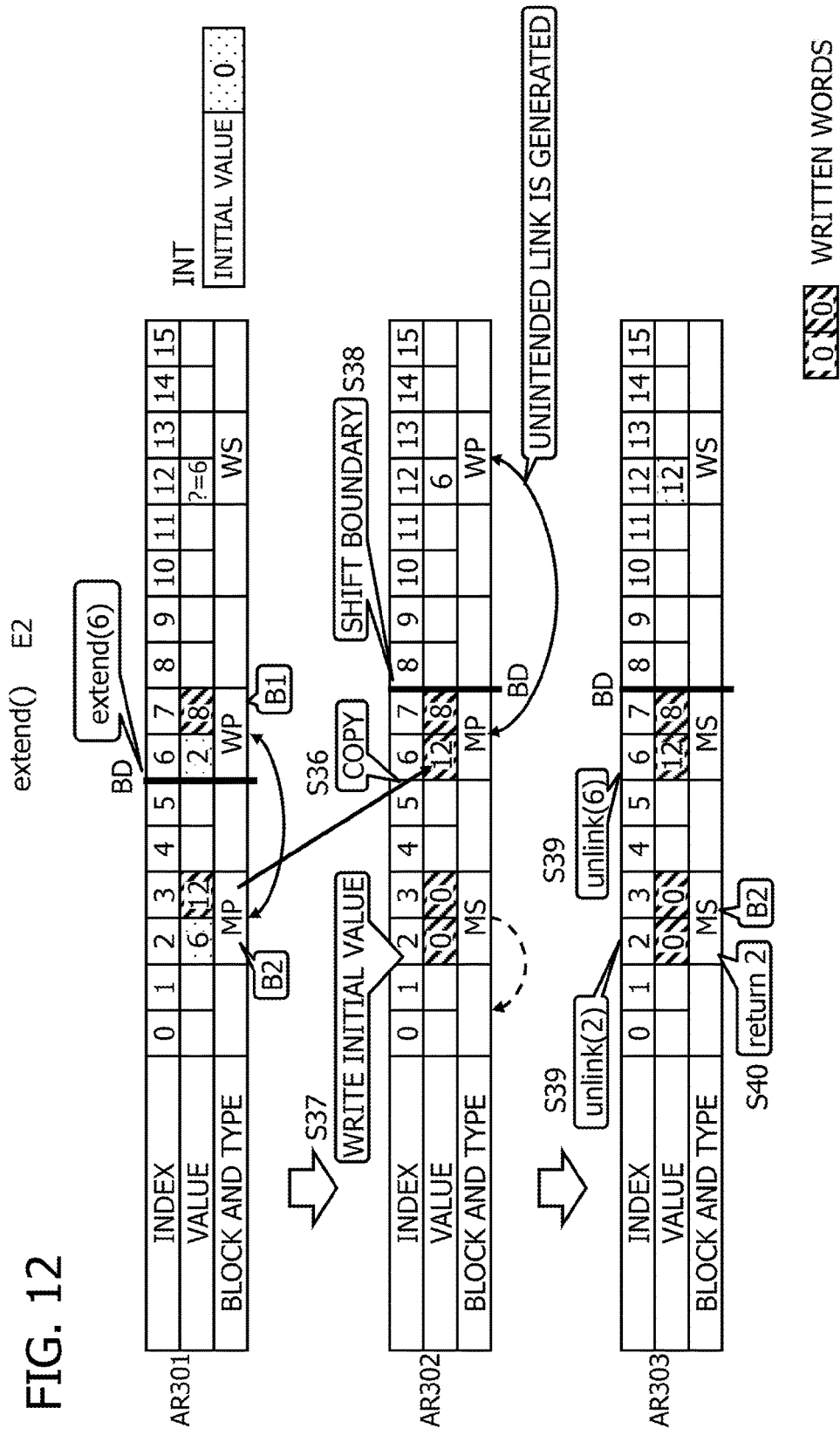
FIG. 12 is a diagram of extend control E2 performed when the block B1 in the W area that is adjacent to the boundary is of the WP type.

FIG. 10 is a flowchart of control of the extend "extend( )". FIG. 11 is a diagram of extend control E1 performed when the block B1 in the W area that is adjacent to the boundary is of the WS type. FIG. 12 is a diagram of extend control E2 performed when the block B1 in the W area that is adjacent to the boundary is of the WP type.

As illustrated in the flowchart in FIG. 10, when the extend "extend( )" is invoked, the processor executing the array control program determines the type of the block B1 in the W area that is adjacent to the boundary (the block with the index of the boundary pointer) (S31).

(E1) As illustrated in FIG. 11, if the boundary right block B1 is of the WS type (WS in S31), the processor writes the initial value "0" to the unwritten block WS (B1) (S32), shifts the boundary to extend the M area by one block (S33), and executes the unlink "unlink" process as needed so as to set the type of the block B1 to MS (S34). The initialized block (to which the initial value "0" has been written) MS is returned as an empty block MS as a write target (S35). In other words, in this process, the boundary right block WS (B1) is changed directly to an initialized MS to remove the one boundary right block WS (B1) while adding the one MS (B1), thus preventing the numbers of MPs and WPs from being varied to keep the numbers of MPs and WPs equal to each other.

(E2) On the other hand, as illustrated in FIG. 12, if the boundary right block B1 is of the WP type (WP in S31), the processor writes (copies) the data "12" written to the data word (i=3) in the link destination block MP (B2) to the address word (i=6) in the written block WP (B1) (S36), and writes the initial value "0" to all the words in the link destination MP (B2) (S37). The processor then shifts the boundary to extend the M area by one block (S38) and executes the needed "unlink" process (S39) to change both the boundary right block WP (B1) and the link destination block MP (B2) thereof to written blocks MS. The initialized blocks MS (B2) (to which the initial value "0" has been written) are returned (S40). In other words, since the "extend" removes the one WP (B1), this process removes the one MP (B2) while adding the one MS to keep the number of MPs equal to the number of WPs. However, the MP (B2), which is the link destination of the boundary right block WP (B1), is precluded from being changed to an initialized MS, the data "12" in the MP (B2), which is the link destination of the boundary right block WP (B1), is written to the boundary right block WP (B1), which thus changes to an MS. The initial value "0" is then written to the link destination MP (B2) to generate an initialized MS. Consequently, the number of the MPs in the M area is kept equal to the number of the WPs in the W area for number juggling.

As described above, the meaning of the extend "extend" process is as follows. For example, when the write is executed on an unwritten block MP to change the unwritten block MP to a written block MS, the number of the MPs in the M area decreases. On the other hand, when the write is executed on an unwritten block WS to change the unwritten block WS to a written block WP, the number of the WPs in the W area increases. Thus, for the management target blocks MP and WP in the M and W areas, the number of MPs decreases or the number of WPs increases. As a result, to maintain the condition that the numbers of the MPs and the WPs are kept the same, the boundary needs to be shifted rightward, an MP needs to be added to deal with the reduced number of MPs, and an MP also needs to be added to deal with the increased number of WPs.

For the number juggling, the extend "extend" process is executed. As described above, in the extend "extend" process, the boundary is shifted rightward to generate an initialized MS (to which the initial value has been written). Then, in the write "write" process described below, a write value is written directly to the initialized MS, or the position of the initialized MS is shifted and the write value is written to the shifted initialized MS block.

["write(i, x)"; Write the Value x to the Index i]

Figure 13:
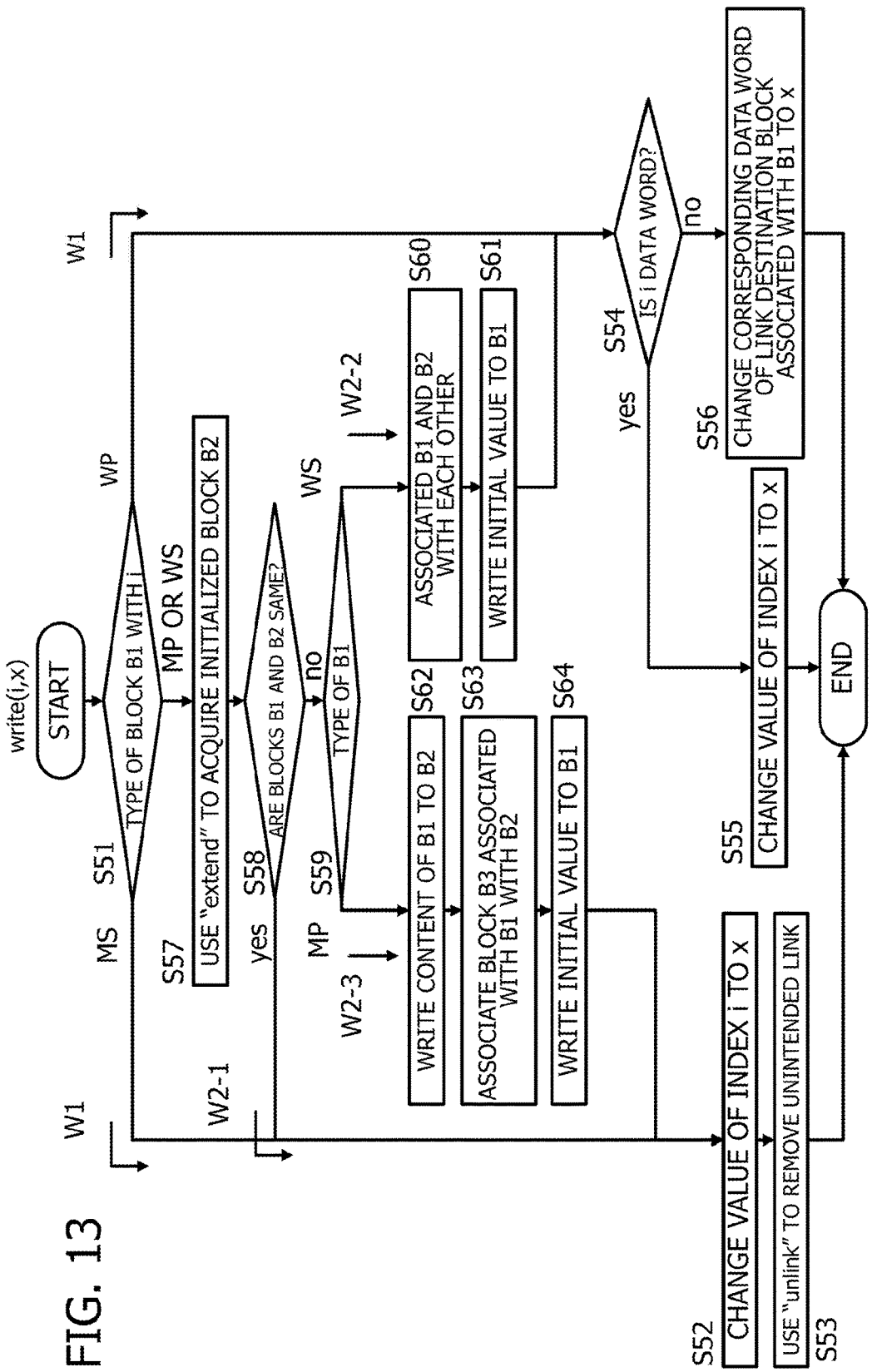
FIG. 13 is a flowchart illustrating control of the write "write(i, x)".
Figure 14:
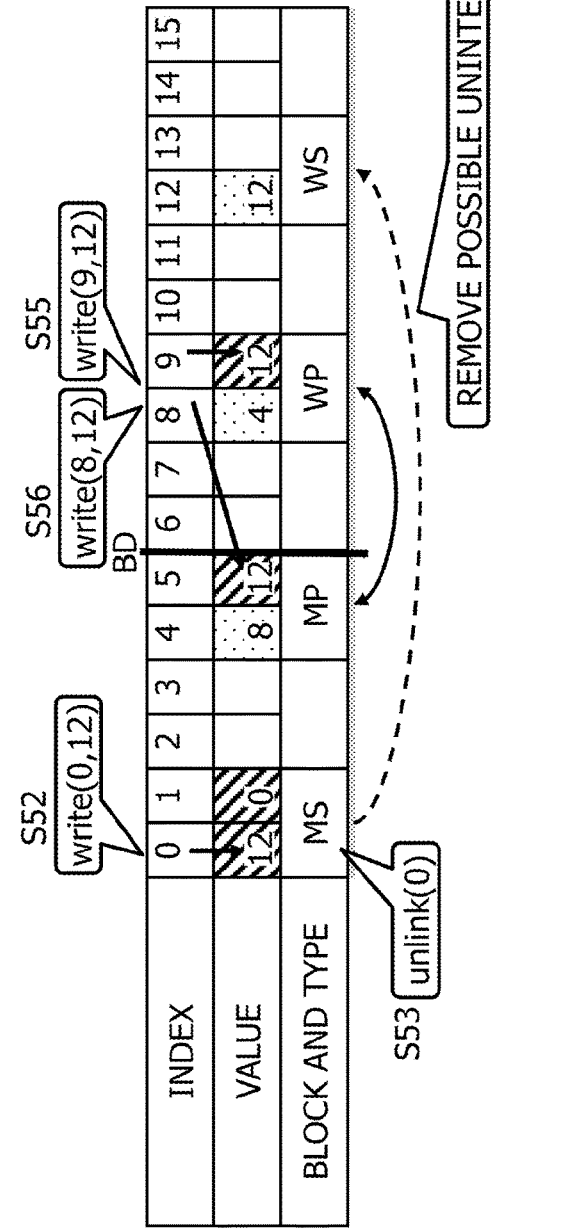
FIG. 14 is a diagram illustrating a process W1 of the write.
Figure 15:
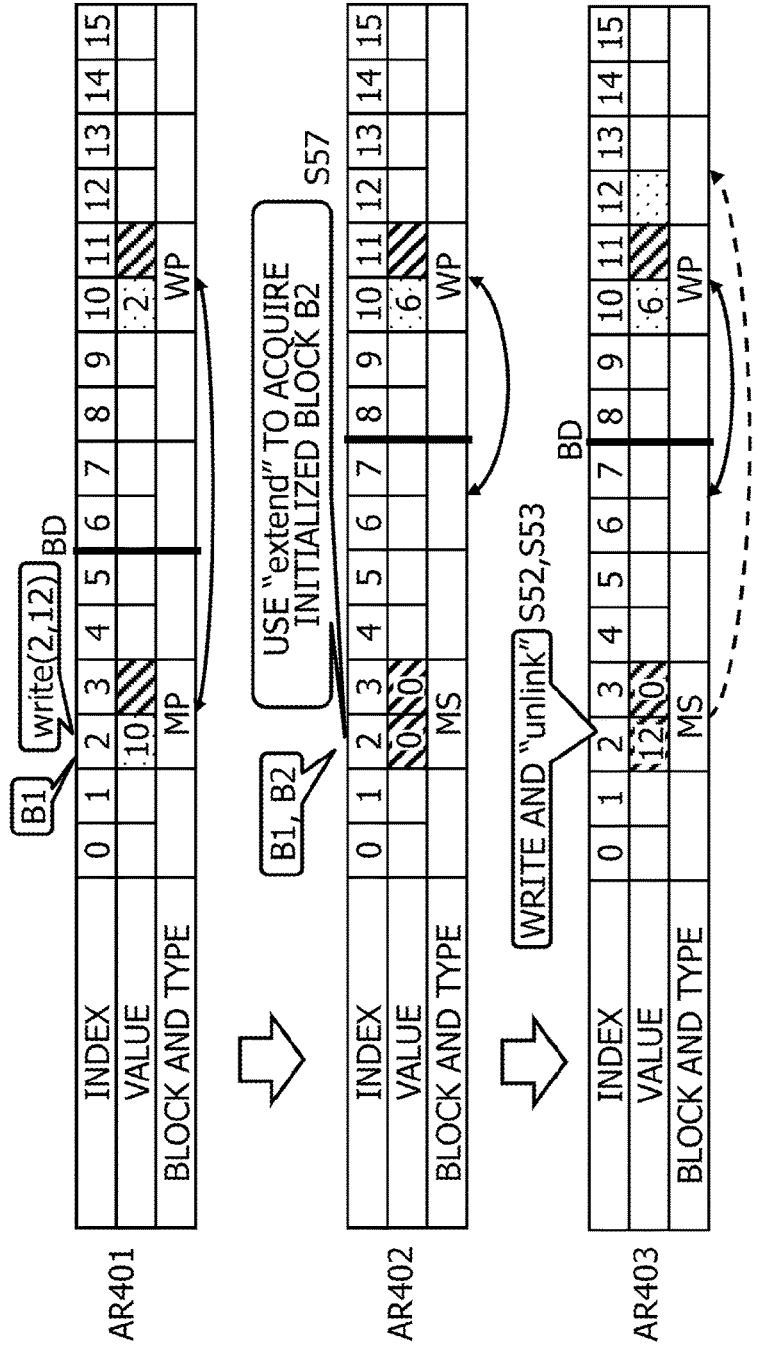
FIG. 15 is a diagram illustrating a write process W2-1.
Figure 16:
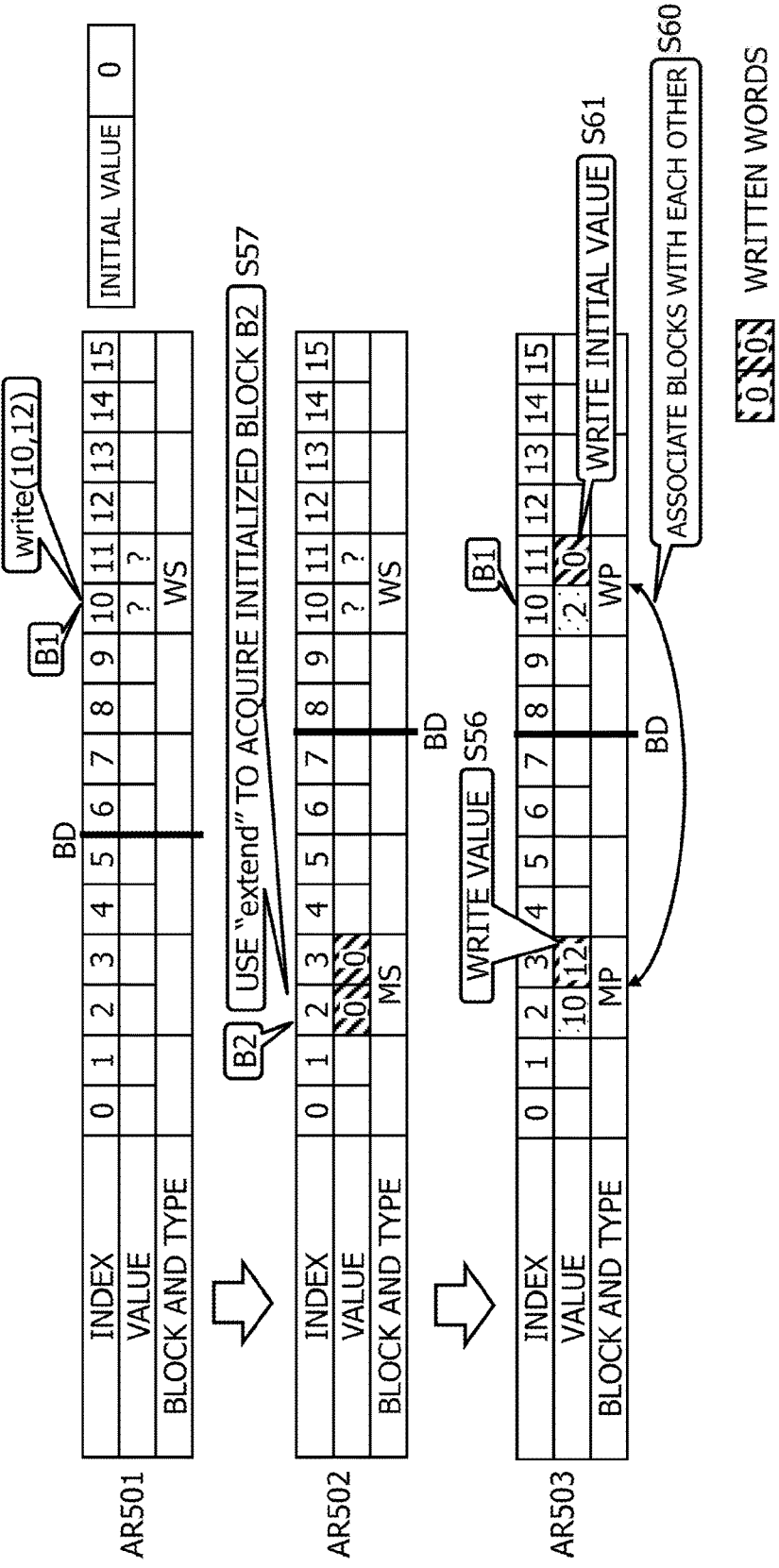
FIG. 16 is a diagram illustrating a write process W2-2.

FIG. 13 is a flowchart illustrating control of the write "write(i, x)". FIG. 14 is a diagram illustrating a process W1 of the write. FIG. 15, FIG. 16, and FIG. 17 are diagrams illustrating write processes W2-1, W2-2, and W2-3, respectively. In this case, a block with a write destination index is denoted as B1, a block that is acquired by the extend "extend" is denoted as B2, and a block associated with the block B1 is denoted as B3.

When the write "write(i, x)" is invoked, the processor executing the array control program determines the type of the block B1 with the write destination index i (S51).

(W1) As illustrated in FIG. 14, if the type of the block B1 with the write destination index i is the written block MS or WP (MS or WP in S51), the write destination is identified using the same method as that for the read "read" process, and a write value x is written to the write destination. For example, if the block B1 with the index i is an MS, the write value is written to the block B1 (MS) with the index i (S52) and an unintended link is removed using the unlink "unlink" (S53). If the block B1 with the index i is a WP and the index i is a data word (YES in S54), the write value x is written to the index i (S55). If the index i is an address word (NO in S54), the value x is written to the data word of the link destination block MP of the write destination block WP (B1) (S56). FIG. 14 illustrates that write(0,12) is written in step S52, write(9,12) is written in step S55, and write(8,12) is written in step S56.

(W2) If the type of the block B1 with the write destination index i is the unwritten block MP or WS, the extend "extend" process is executed to acquire the initialized block B2 (MS) (S57). See AR401 and AR402 in FIG. 15.

(W2-1) As illustrated in FIG. 15, if the write destination block B1 is the same as the initialized block B2 acquired by the extend process (YES in S58), since the write destination block B1 is the initialized MS, the value x is written to the index i (S52) and the needed "unlink" process is executed to remove an unintended link to maintain the MS as in a case where the write destination is an MS (S53). In AR401, AR402 of FIG. 15, for write(2,12), the write destination block B1 (MP) is changed to an initialized MS by the "extend", and instead, a block with an index 6 is changed to the link destination of the B1 link destination block WP that was the link destination of B1. A value "12" is written to the write destination block B1 that was changed to the initialized MS, and the link is removed by "unlink(2)". See AR403.

In other words, in the write W2-1, the initialized block B2 (MS) acquired by the "extend" process matches the write destination block B1, and thus, the value "12" is written to the write destination index i.

(W2-2) As illustrated in FIG. 16, if the write destination block B1 and the initialized block B2 are different from each other (NO in S58) and the B1 is of the WS type (WS in S59), see AR501, the initialized block B2 (MS) is acquired by the "extend" (AR502) and a bidirectional link is generated between the write destination block B1 (WS) and the initialized block B2 (MS) to associate the blocks B1 and B2 with each other (S60), see AR503. The initial value "0" is written to the write destination block B1 (a WP to which the WS has been changed by generation of the link) (S61). Then, the write value is written as in a case where the write destination block B1 is a WP (S54, S55, S56). In FIG. 16, for write(10, 12), a write destination index 10 is an address word, and thus, the write value "12" is written to the data word (index 3) of the link destination block B2 (MP) of the write destination block B1 (WP). See AR503.

In other words, the write destination block B1 needs to be changed from WS to an initialized WP before the write is executed, and thus, the initialized block B2 (MS) acquired by the "extend" is changed to the link destination block MP of the initialized WP. This change substantially means that the position of the initialized block B2 (MS) acquired by the "extend" process has been shifted to the write destination block B1 (initialized WP).

(W2-3) As illustrated in FIG. 17, if the write destination block B1 and the initialized block B2 are different from each other (NO in S58) and the B1 is of the MP type (MP in S59), see AR601, the value of the data word of the write destination block B1 (MP) is written to the initialized block B2 (MS) (S62). Then a link is formed between the link destination block B3 (WP) of the write destination block B1 (MP) and the initialized block B2 (S63). As a result, the initialized block B2 changes from MS to MR See AR602. Then, the initial value is written to the write destination block B1 (S64), which thus changes to an initialized block MS. See AR603. Consequently, the block B2 (initialized MS) acquired by the "extend" process substantially shifts to the write destination block B1. Then, the value "12" is written as in a case where the write destination block B1 is an MS (S52, S53). That is, the write value "12" is written to the write destination block B1 (S52), and an unintended link is removed by the "unlink" process (S53).

In other words, the write destination block B1 needs to be changed from an MP to an initialized MS before the write is executed, and thus, the initialized block B2 (MS) acquired by the "extend" is changed to the link destination MP of the block B3 (WP) instead of the write destination block B1. Thus, substantially, the block B2 (initialized MS) acquired by the "extend" is changed to the link destination of the block B3 (WP), which has been the link destination of the write destination B1 (MS), and the write destination block B1 is changed to the initialized MS, to which the value "12" is written.

[Specific Examples of the Initialization, Write, and Read]

Now, the initialization, the write, and the read will be described in accordance with specific examples. The specific examples described below illustrate that, after the initialized state is established, the write is executed on an unwritten block WS to increase the number of written blocks WP by one and increase the number of bidirectional links as well. Further, the specific examples described below illustrate that the number of written blocks WP is reduced by one by executing the "extend" when the boundary right block is an WP. The specific examples also illustrate that the "extend" increases the size of the M area while reducing the size of the W area. The specific examples further illustrate that a reduced size of the W area reduces the number of bidirectional links and the amount of management information.

FIG. 18 illustrates a specific example of the initializable array AR, and the initialization. An array AR0 is an initializable array that has an array length of 16 and in which one block includes two words. The value "12" of the boundary pointer BD_P indicates that the boundary BD lies between an index 11 and an index 12 and that the value "13" of the initial value area INT is an initial value. Therefore, in the initial state where the value of the boundary pointer is "0", the values in the main area of the array are all undefined values. The values in the written blocks MS, WP are true values when the value of the boundary pointer is changed to be larger than "0". For the block types MS, MP, WS, WP, no values are actually saved in the array. The block type can be calculated in a constant time based on the index i of the block, the boundary pointer BD_P, and the value of the address word in the block.

When the initialization "initialize(0)" is invoked, the processor executes the array control program to set the initial value "0". Specifically, the processor changes in the array AR 1 the value of the boundary pointer BD_P to "0" (S1 in FIG. 5A) and writes the initial value "0" to the initial value area INT (S2). Since the boundary pointer is set to "0", all the blocks are of the unwritten block WS type. All the indices have an undefined value.

Figure 19:
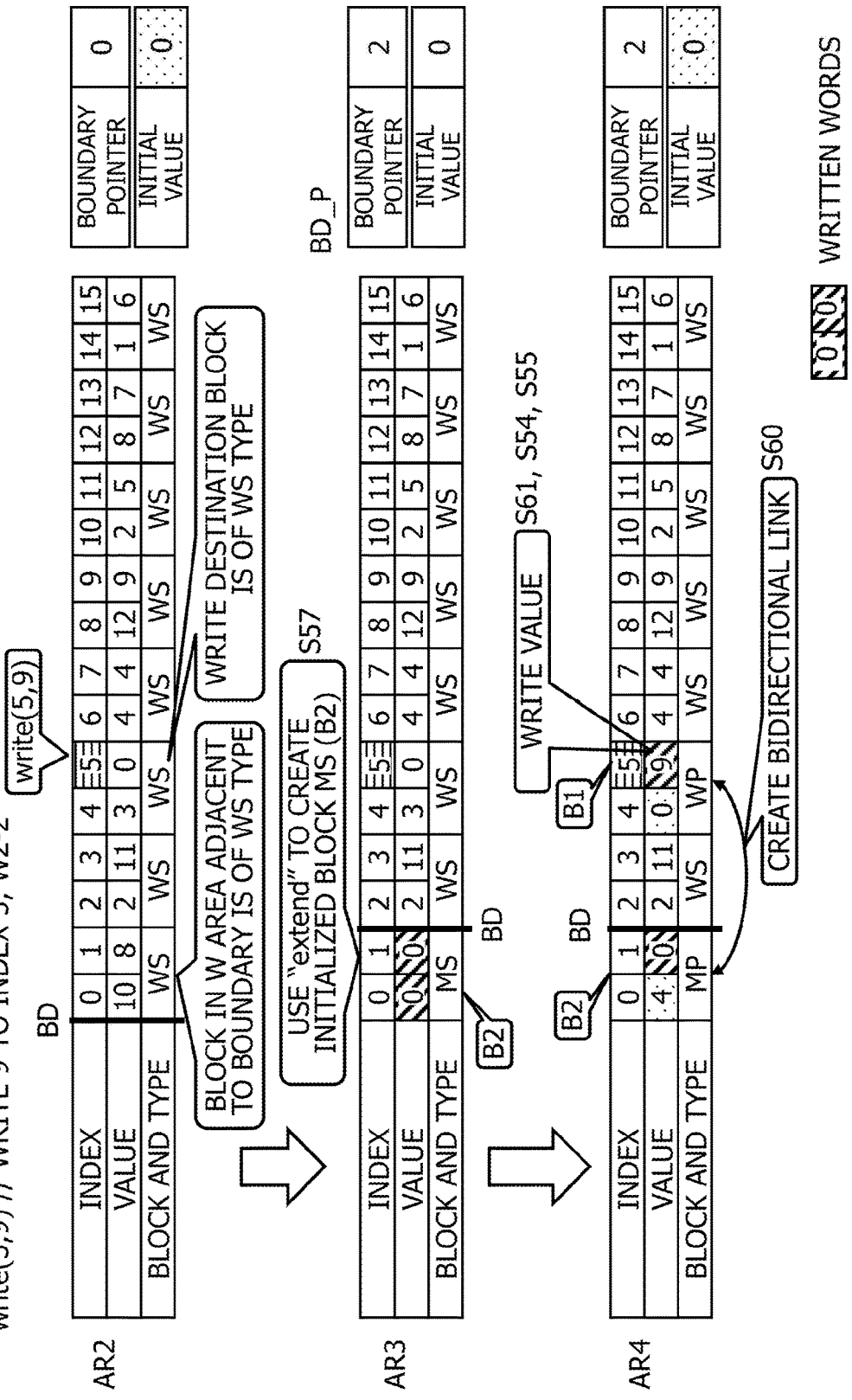
FIG. 19 is a diagram illustrating a specific example of the write 2-2 described in FIG. 16.

FIG. 19 is a diagram illustrating a specific example of the write 2-2 described in FIG. 16. The array AR2 is the same as the array AR1 in the initial state. In the array AR2, the write "write(5, 9)" is invoked, and the processor writes a value "9" to an index 5. In this write, the type of the block on which the write is executed is the unwritten block WS, and the type of the block in the W area that is adjacent to the boundary BD is the WS.

Thus, in the array AR3, the processor executes the extend "extend" to change the boundary pointer BD_P to "2" to shift the boundary BD, generating an initialized block MS (B2) (to which the initial value "0" has been written) in the M area (S57). The extend "extend" is the process E1 in FIG. 11. In an array AR4, the processor creates a bidirectional link between the write destination block B1 and the initialized block MS (B2) (S60), and writes the write value "9" to the write destination index 5 (S61, S54 and S55). Consequently, when the write is executed on an unwritten block WS different from the block in the W area that is adjacent to the boundary BD, the "extend" E1 shifts the boundary to increase the size of the M area while reducing the size of the W area, with the number of bidirectional links increased by one.

Figure 20:
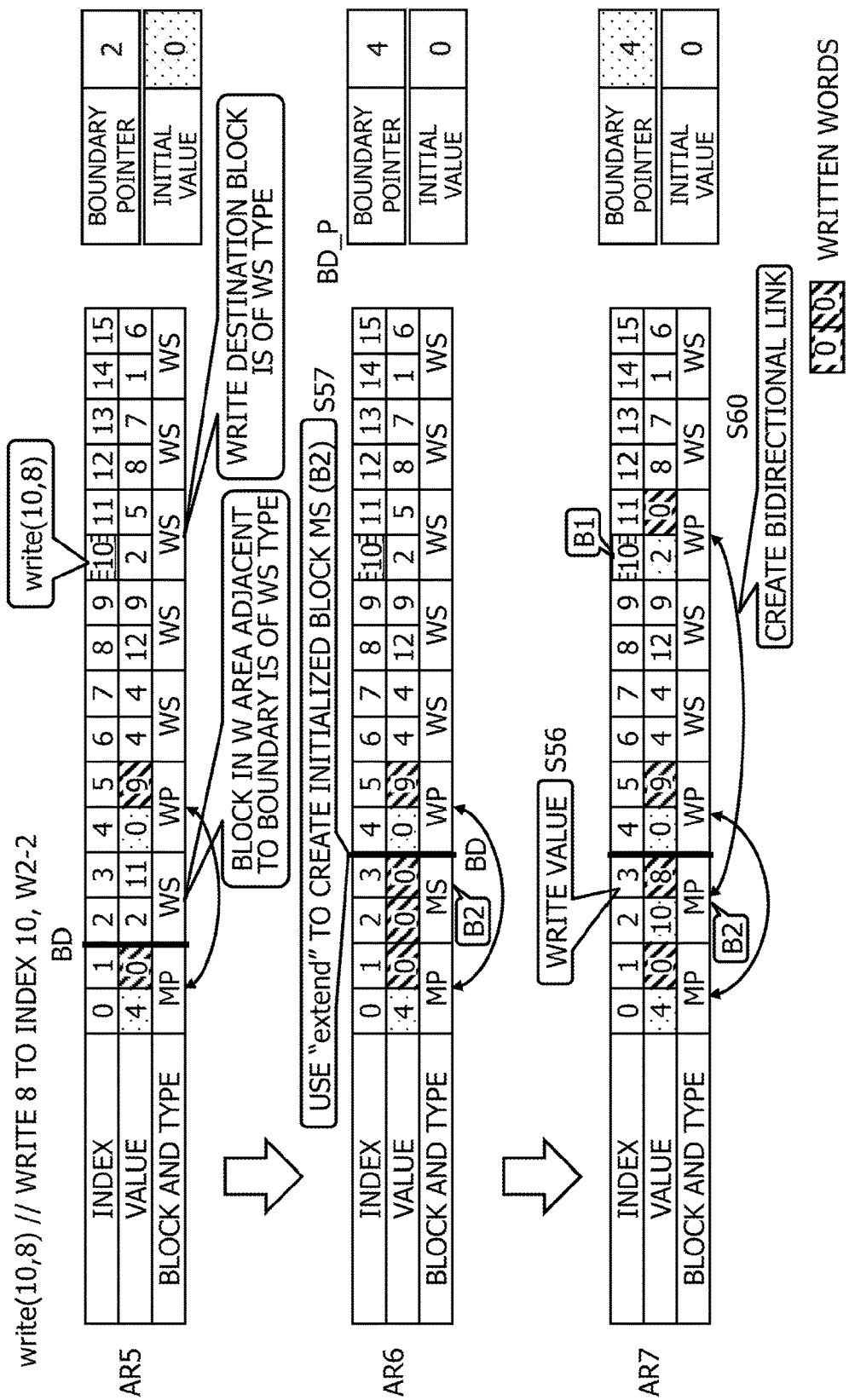
FIG. 20 is a diagram illustrating a specific example of the write W2-2 described for FIG. 16.

FIG. 20 is a diagram illustrating a specific example of the write W2-2 described for FIG. 16. In an array AR5 (=AR4), the write "write(10, 8)" is invoked, and the processor writes a value "8" to the index 10. In this write, the type of the block on which the write is executed is the unwritten block WS, and the type of the block in the W area that is adjacent to the boundary BD is the WS.

Thus, in an array AR6, the processor executes the extend "extend" to change the boundary pointer BD_P to "4" to shift the boundary BD, and generates an initialized block MS (B2) (to which the initial value "0" has been written) in the M area (S57). The extend "extend" is the process E1 in FIG. 11. In an array AR7, the processor creates a bidirectional link between the write destination block B1 and the initialized block MS (B2) (S60), and writes a write value "8" to the data word (index 3) of the link destination block B2 of the write destination block B1 because the write destination index 10 is an address word (S56). As is the case with FIG. 19, when write is executed on an unwritten block WS different from the block in the W area that is adjacent to the boundary BD, the boundary is shifted to increase the size of the M area while reducing the size of the W area, with the number of bidirectional links increased by one.

Figure 21:
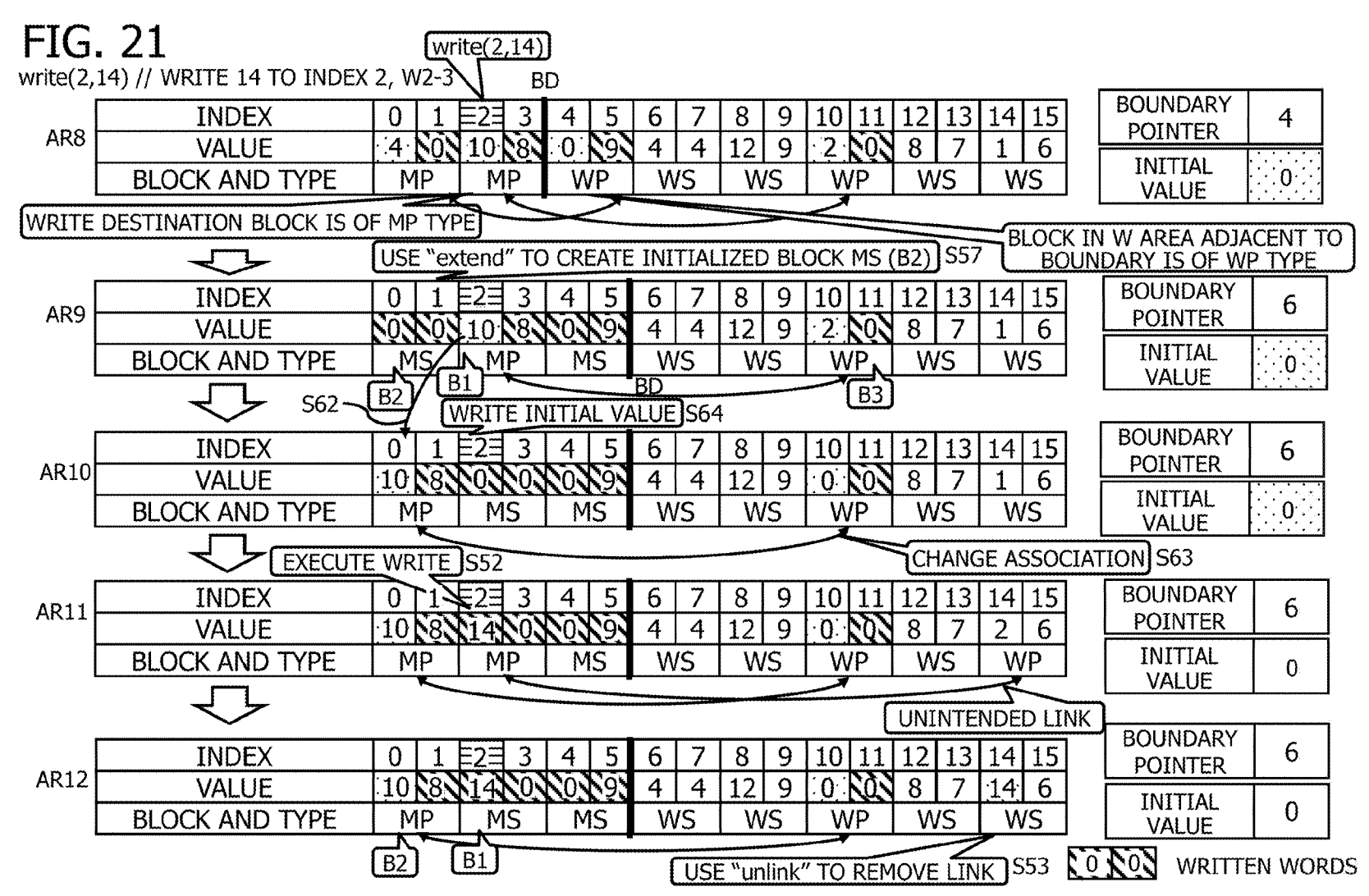

FIG. 21 is a diagram illustrating a specific example of the write W2-3 described for FIG. 16. In an array AR8 (=AR7), the write "write(2, 14)" is invoked, and the processor writes a value "14" to the index 2. In this write, the type of the block on which the write is executed is the unwritten block MP, and the type of the block in the W area that is adjacent to the boundary BD is the WP.

Thus, in an array AR9, the processor executes the extend "extend" to change the boundary pointer BD_P to "6" to shift the boundary BD, and generates an initialized block MS (B2) (to which the initial value "0" has been written) in the M area (S57). The extend "extend" is the process E2 in FIG. 12. In an array AR10, the processor writes the content of the write destination block B1 (MP) to the initialized block B2 (MS) (S62), and writes the index 0 of the B2 to the address word (i=10) of the link destination block B3 (WP) of the write destination block B1 to change the bidirectional link (S63). The initial value is written to the write destination block B1, which thus changes to an initialized block MS (S64). See AR10. Subsequently, in an array AR11, the processor writes the write value "14" to the write destination index 2 (S52), and in an array AR12, the processor removes an unintended link generated in the write destination block B1 (S53). In this case, the extend "extend" increases the size of the M area while reducing the size of the W area, and reduces both the number of written blocks WP and the number of bidirectional links by one.

Figure 22:
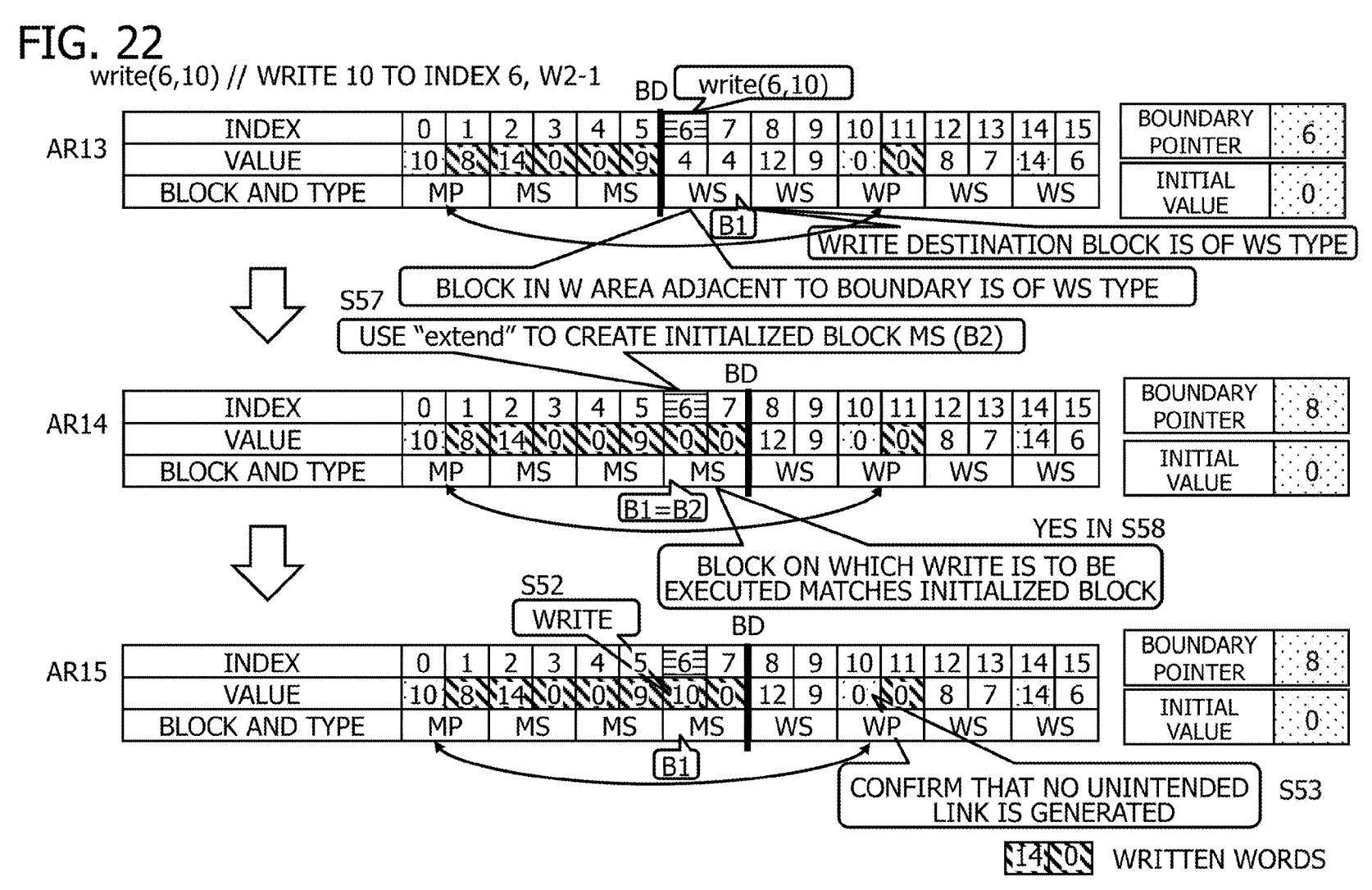

FIG. 22 is a diagram illustrating a specific example of the write W2-1 described for FIG. 16. In an array AR13 (=AR12), the write "write(6, 10)" is invoked, and the processor writes the value "10" to the index 6. In this write, the type of the block on which the write is executed is the unwritten block WS, and the type of the block in the W area that is adjacent to the boundary BD is the WS.

Thus, in an array AR14, the processor executes the extend "extend" to change the boundary pointer BD_P to "8" to shift the boundary BD, and generates an initialized block MS (B2) (to which the initial value "0" has been written) in the M area (S57). The extend "extend" is the process E1 in FIG. 11. In the array AR14, the write destination block B1 matches the initialized block MS (B2) generated by the "extend" (YES in S58). Thus, in an array AR15, the processor writes the value "10" to the index 6 of the write destination block B1 (MS) (S52), and confirms that no unintended link is generated in the write destination block B1 (S53). In this case, the extend "extend" increases the size of the M area while reducing the size of the W area. However, the numbers of unwritten blocks MP and written blocks WP remain unchanged, and the number of bidirectional links also remains unchanged.

Figure 23:
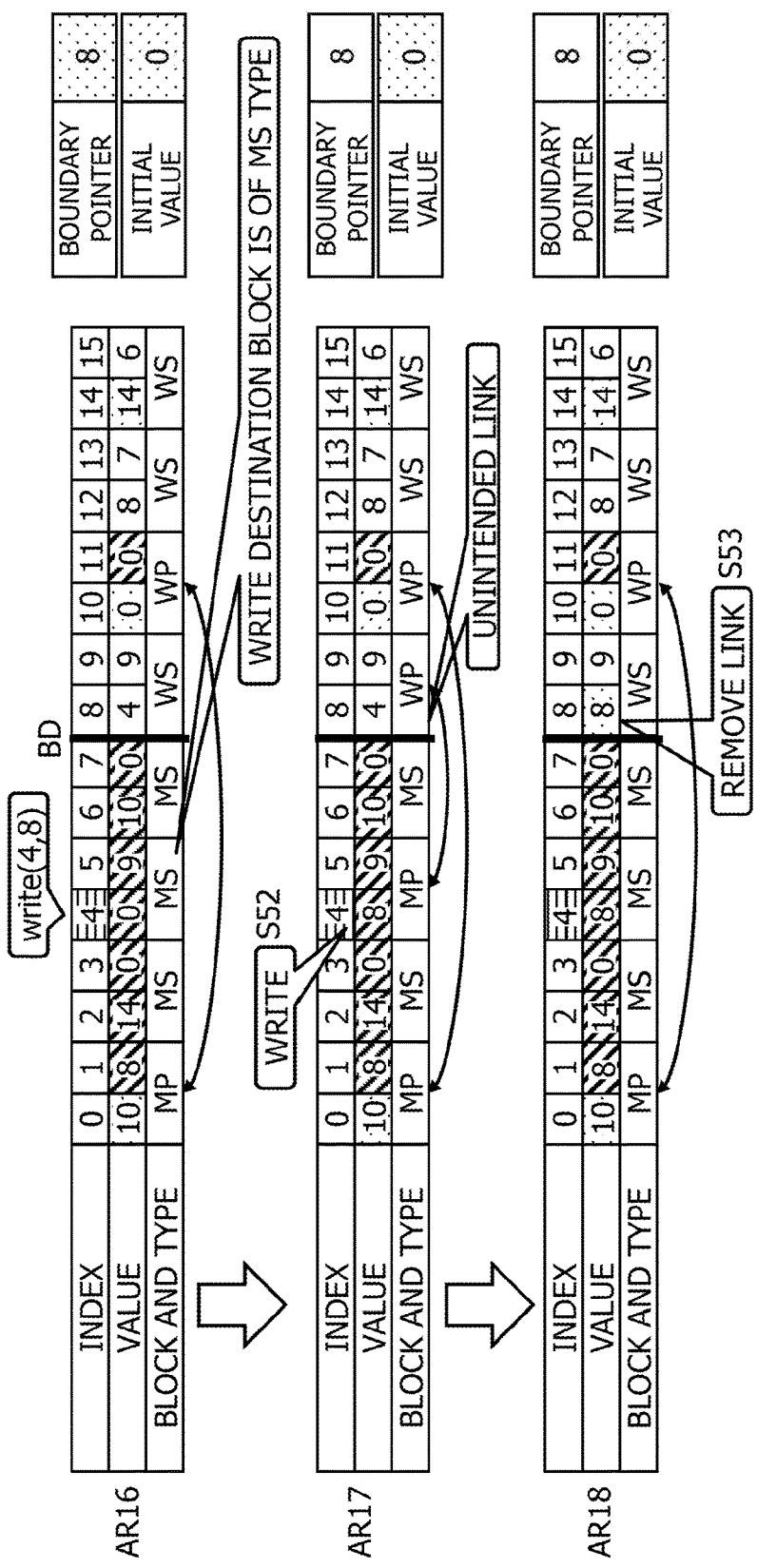
FIG. 23 is a diagram illustrating a specific example of the write W1 described for FIG. 16.

FIG. 23 is a diagram illustrating a specific example of the write W1 described for FIG. 16. In an array AR16 (=AR15), the write "write(4, 8)" is invoked, and the processor writes the value "8" to the index 4. In this write, the type of the block on which the write is executed is the written block MS (MS in S51). Since the write is executed on the written block, no initialized block MS needs to be generated by shifting the boundary using the extend "extend".

In an array AR17, the processor writes the value "8" to the index 4 of the write destination block B1 (MS) (S52). This write generates an unintended link between the write destination block B1 and the block with the index 8. Thus, in an array AR18, the index 8 of the block is written to the index 8 to remove the unintended link (S53). In this case, the sizes of the M area and the W area remain unchanged, the numbers of unwritten blocks MP and written blocks WP also remain unchanged, and the number of bidirectional links also remains unchanged.

As described above, repeated execution of the write on the array gradually shifts the boundary. Immediately after the initialization, only a small number of bidirectional links are provided, and thus, a small amount of management information (information on the bidirectional links) can be saved in the main area of the array in spite of a small number of blocks in the M area. Subsequently, execution of the write on the unwritten blocks WS shifts the boundary to increase the number of bidirectional links. However, the number of the blocks in the M area also increases to allow the increased amount of management information (information on the bidirectional links) to be saved in the main area of the array. As the boundary approaches the maximum index, the number of bidirectional links is reduced, for example, by changing write destination blocks WP to written blocks MS using the "extend". As a result, a reduced amount of management information can be saved in spite of a small number of blocks in the W area. In other words, hybridized management is performed that manages the number of the unwritten blocks in the M area and the number of the written blocks in the W area. Thus, the number of bidirectional links is small when total number of writes is small at the initialization and when the total number of writes is large at the completion, whereas the number of bidirectional links is increased at the middle stage between the initialization and the completion, so that the management information on the bidirectional links can be saved in the array.

FIGS. 24A-24C are diagrams illustrating a specific example of three types of the read "read". In an array AR19 (=AR18), the read "read(1)" is invoked, and the processor reads the value of the index 1. The type of a read destination block is the unwritten block MP (MP in S21), and thus, the processor reads and returns the value "0" in the initial value area INT (S22).

In an array AR20, the read "read(2)" is invoked, and the processor reads the value of the index 2. The type of the read destination block is the written block MS (MS in S21), and thus, the processor reads and returns the value "14" of the index 2 (S23).

In an array AR21, the read "read(8)" is invoked, and the processor reads the value of the index 8. The type of a read destination block is the unwritten block WS (MP in S21), and thus, the processor reads and returns the value "0" in the initial value area INT (S22).

FIGS. 25A-25C are diagrams illustrating specific examples of two types of the read "read". In an array AR22 (=AR21), the read "read(10)" is invoked, and the processor reads the value of the index 10. The type of the read destination block is the written block WP (WP in S21) and a read destination index is an address word (NO in S24). Thus, the processor reads and returns the value "8" (the value of the index 1) of the data word of the link destination unwritten block MP of the read destination block WP (S25).

In an array AR23, the read "read(11)" is invoked, and the processor reads the value of the index 11. The type of the read destination block is the written block WP (WP in S21), and the read destination index is a data word (YES in S24). Thus, the processor reads and returns the value "0" of the read destination index 11 (S23).

Finally, in an array AR24, the initialization "initialize(7)" is invoked, and the processor performs the initialization using an initial value 7. That is, the processor changes the value of the boundary pointer BD_P to "0" (S2) and changes the initial value area INT to the initial value "7" (S1). As a result, the boundary BD shifts to the left end of the array so that all the blocks are unwritten blocks WS.

Second Embodiment

Figure 26:
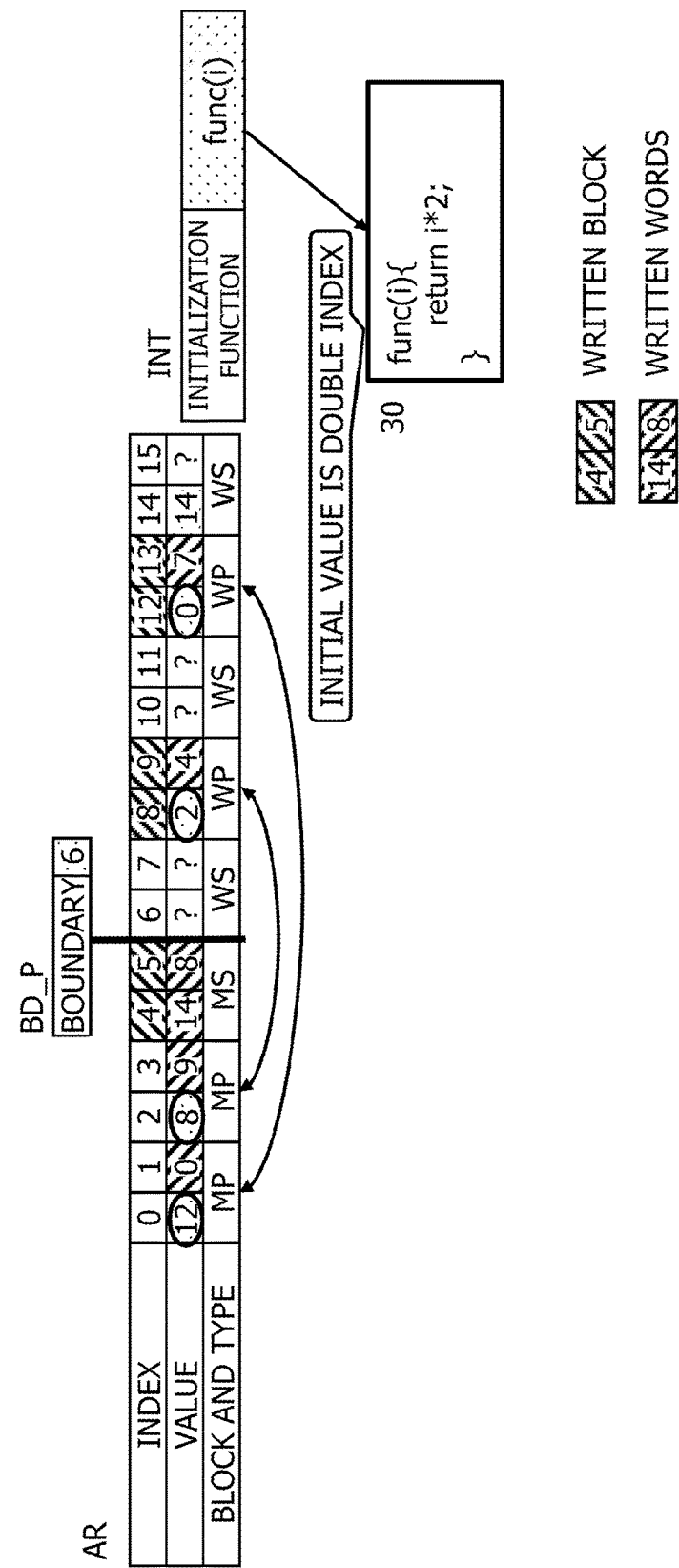
FIG. 26 is a diagram illustrating an initializable array in a second embodiment.

FIG. 26 is a diagram illustrating an initializable array in a second embodiment. In the array AR, an initialization function "func(1)" is set in the initial value area INT. The second embodiment is otherwise the same as the first embodiment.

In an example 30 of the initialization function "func(i)", when the initialization function "func(i)" is invoked, return of a value "2*i" that is double the index I is implemented. Therefore, when the read "read(i)" of the index 6, 7, 10, 11, 14, 15 of the unwritten block in the array is invoked, the processor executes the array control program to call the initialization function "func(i)" in the initial value area INT and returns the value "2*i". As a result, the value that is double the index i is returned.

Figure 27:
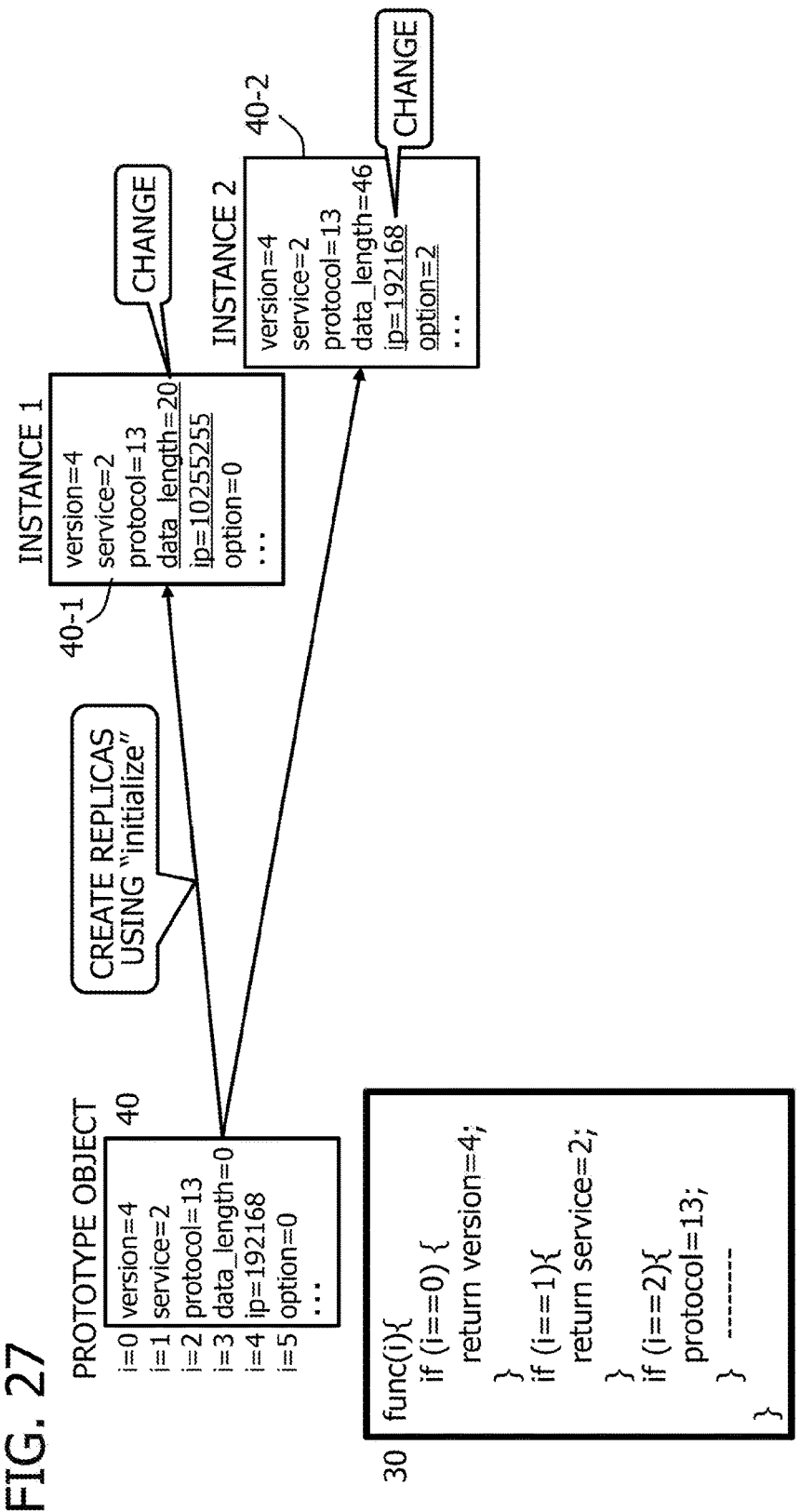
FIG. 27 is a diagram illustrating a specific example of the array in the second embodiment.

FIG. 27 is a diagram illustrating a specific example of the array in the second embodiment. In the specific example, for example, server configuration files are defined based on arrays, and a prototype object 40 is generated as the initialization function "func(i)". When arrays 40_1, 40_2 for configuration files for a plurality of instances are generated, the array in the object 40 is initialized to generate replicas of the object 40 as arrays of instances 40_1, 40_2, and each of the arrays is only partly changed. Consequently, the initialization and the write can be executed in a fixed time, allowing the configuration files for the plurality of instances to be completed in a fixed time independently of the size of each configuration file.

In FIG. 27, an example of the initialization function "func(i)" is denoted as 30. For example, if the instance configuration files 40_1, 40_2 are referenced, when the read "read(i)" with the index i other than changed indices is invoked, the initialization function "func(1)" is invoked, and configuration items and configuration values, for example, version=4 and service=2 are returned in association with each index i.

Third Embodiment

Figure 28:
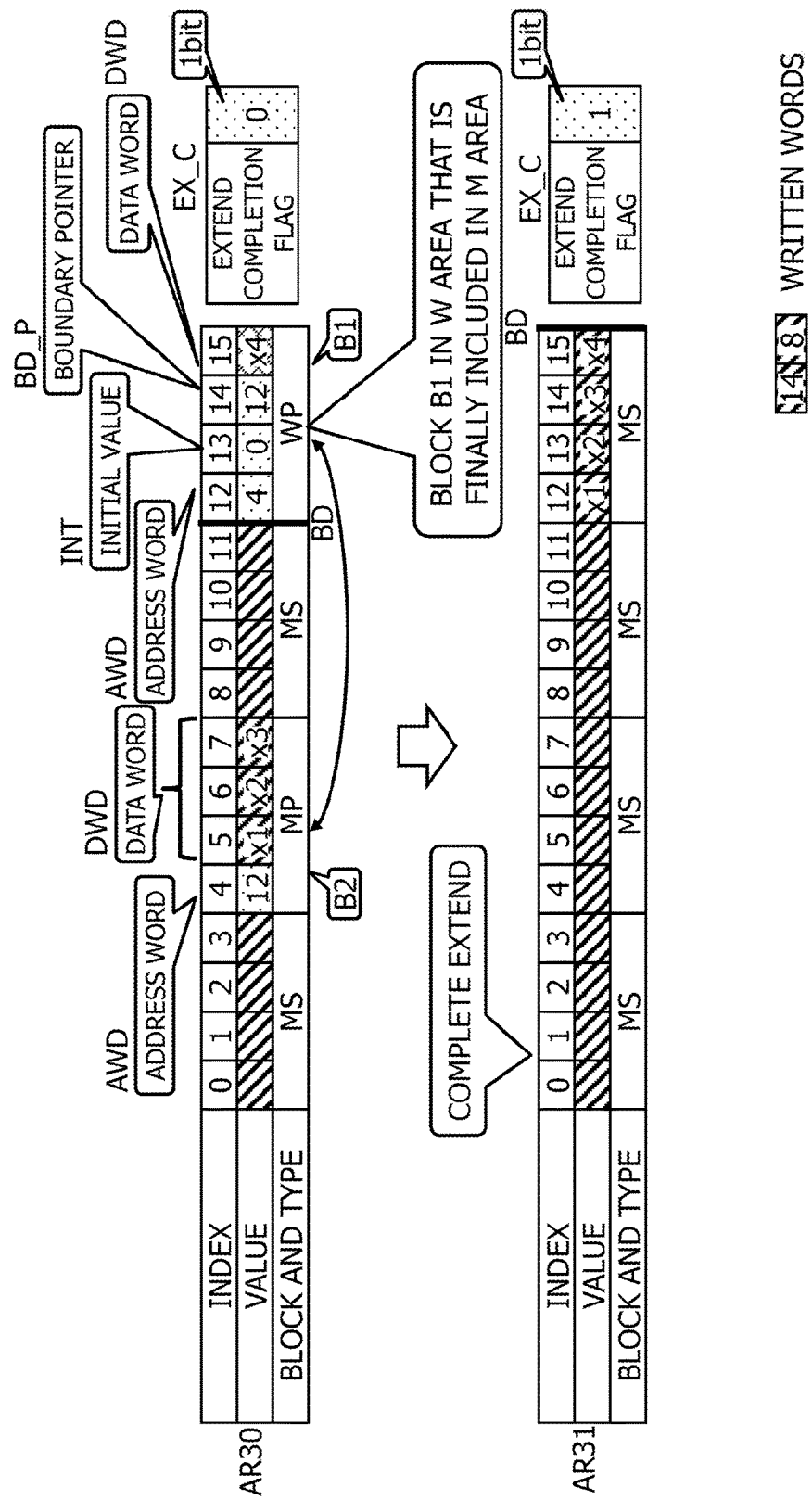
FIG. 28 is a diagram illustrating an initializable array in a third embodiment.

FIG. 28 is a diagram illustrating an initializable array in a third embodiment. For the arrays in the first and second embodiments, the management information including the boundary pointer BD_P and the initial value area INT is saved in the extra space outside the array. Therefore, the size of the extra space for the management information is equal to a constant word O (log N). In this case, log means a base 2 binary logarithm. For example, the boundary pointer holds the value of the number of digits (the number of bits) of the size N of the array, and is thus of the order O (logN) that depends on logN.

In contrast, an initializable array in the third embodiment also holds the boundary pointer BD_P and the initial value area INT in the array and instead holds a 1-bit extend completion flag EX_C outside the array. As illustrated in an array AR30, as constant-word management information, the boundary pointer BD_P and the initial value area INT are stored in words (indices 13, 14) that are not used for the address word AWD (index 12) or data word DWD (index 15) of the block B1 (final block) in the W area, which is finally included in the M area as a result of repetition of the "extend".

In connection with this, the block size is defined by the number of constant words for the management information+2 words (the address word+the data word that stores therein the value of the address word of the link destination block). In the final block B1 of the array AR30, the indices 12 to 15 have a total of 4 words, the address word AWD, the boundary pointer BD_P, the initial value area INT, and the data word DWD in this order.

Specific control is as described below.
(1) In the initialization, the boundary pointer BD_P=0 and the initial value x are written to the indices 13, 14.
(2) The write is invoked, and each time the "extend" is executed, the boundary pointer BD_P is changed.
(3) When the write to the address word AWD (index 12) of the final block B1 is invoked, a value is written to the data word (index 5) of the link destination block B2 of the final block B1.
(4) When the write to the boundary pointer BD_P (index 13) for the final block B1 is invoked, a value is written to the data word (index 6) of the link destination block B2 of the final block B1.
(5) When the write to the initial value word (index 14) of the final block B1 is invoked, a value is written to the data word (index 7) of the link destination block B2 of the final block B1.
(6) In the state of the array AR30 (a bidirectional link is formed between the block B1 and the block B2), when the write to the link destination block B2 (MP) is invoked, similarly to the array AR 31 the "extend" is executed to write the values of the data word (indices 5, 6, 7) of the link destination block B2 to the final block B1, and the extend completion flag EX_C is changed to the value "1". A value is also written to the write destination index of the block B2. At this point in time, all the blocks are written blocks MS in the M area and the "extend" is no longer invoked. Consequently, no problem is posed even when the boundary pointer and the initial value stored in the block B1 are removed.
(7) In all the subsequent writes, the write destination block B1 is a written block MS, and a value is written to the index i.

For the initializable array, the extra space outside the array is only the 1-bit extend completion flag EX_C. The extra space corresponds to O (1) and is also 1 bit in size. This size is smaller than the size of the extra space for the array in the first and second embodiments, which is represented by the constant word O (logN).

[Comparison of the Initialization Time and the Extra Space]

FIG. 29 is a comparison table for four examples in FIGS. 37 to 39 and the third embodiment. The third embodiment represents for the first and second embodiments. For the five arrays, time complexity and space complexity are indicated. For the time complexity, the order O of the size is indicated for "read", "write", and "initialize". For the space complexity, the order O of the size is indicated for the extra space.

In all of the four examples in FIGS. 37 to 39 and the third embodiment, the "read" and the "write" need a fixed time O (1). In FIGS. 38B, FIG. 39, and the third embodiment, the "initialize" needs the fixed time O (1). On the other hand, for the order of the extra space size, the example in FIG. 37 has a fixed size O (1), the three examples in FIG. 38A, FIG. 38B, and FIG. 39 do not have any fixed size, and the third embodiment has the fixed size O (1), which is also 1 bit. Also in the first and second embodiments, the order of the extra space size is O (log N), which is sufficiently smaller than the order in the examples in FIGS. 37 to 39.

Therefore, in the third embodiment, the "read" time, the "write" time, and the "initialize" time are each a fixed time that is independent of the array size N, and the extra space size is also a fixed size that is independent of the array size N. In the first and second embodiments, the extra space size is represented as O (logN), which is not fixed but which corresponds to a sufficiently small size.

Initializable Array in a Fourth Embodiment

Each of the initializable arrays in the first to third embodiments is divided into two areas at a position where the number of the unwritten blocks MP in the M area is the same as the number of the written blocks WP in the W area (MP:WP=1:1). However, the numbers need not always be the same, but the ratio of the number of the unwritten blocks MP in the M area to the number of the written blocks WP in the W area may be 1:2, 1:3, 1:k (k is an integer 1), or L:K (L and K are integers equal to or larger than 1).

Figure 30:
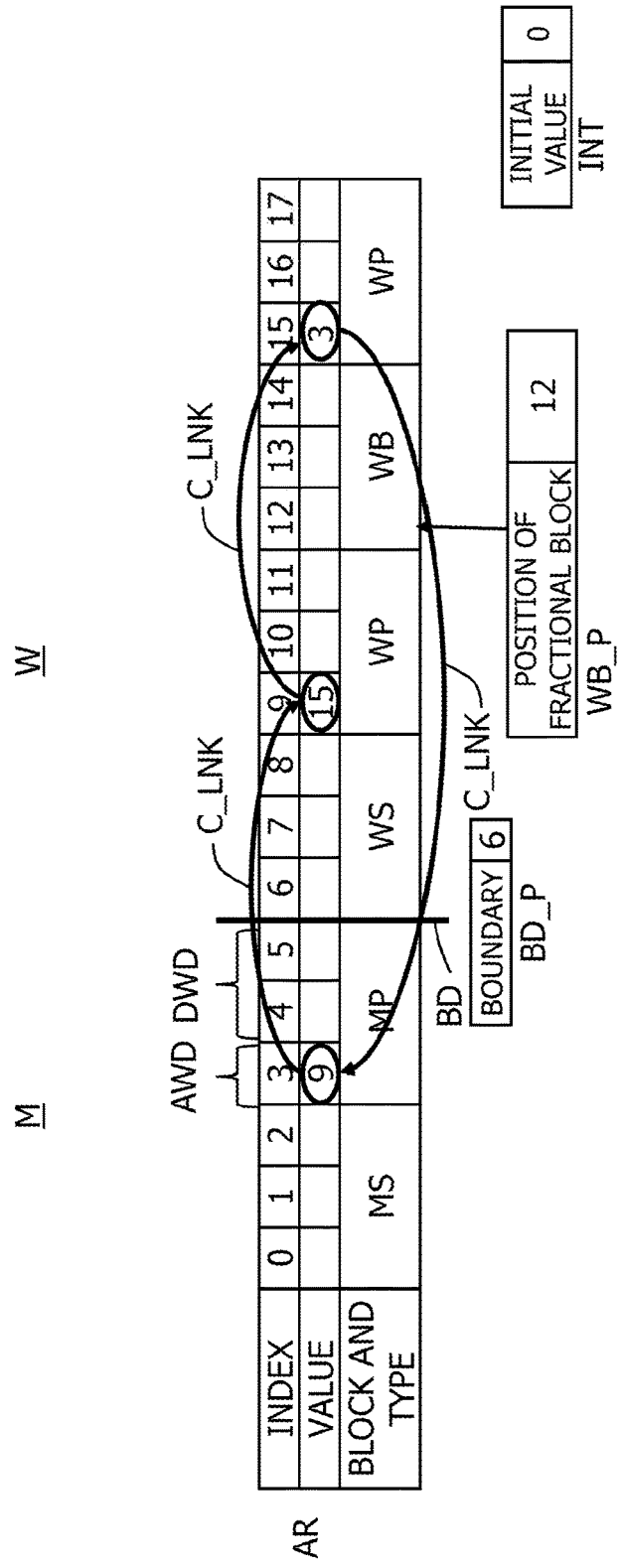
FIG. 30 is a diagram illustrating an initializable array in the fourth embodiment.

FIG. 30 is a diagram illustrating an initializable array in the fourth embodiment. This initializable array AR is divided into two areas at the position where the ratio of the number of the unwritten blocks MP in the M area to the number of the written blocks WP in the W area is 1:2. For this array, the read and the write are executed in a constant time that is independent of the array size, and the initialization is also executed in a constant time. The array may also contain information indicative of either a written block or an unwritten block, and thus, the extra space for management also has a fixed size that is independent of the array size.

The array AR in FIG. 30 has N (=18) elements with indices 0≤i<17, which consecutively form a plurality of (in the example in FIG. 30, five) blocks each having three words (corresponding to the elements in the main area) including one address word AWD and two data words DWD.

Each block includes three elements (words). The element with the minimum index in the block is the address word AWD to which the link destination index of a cyclic link C_LNK described below is written. The elements with the other indices are the data words DWD to which values are written. However, data is also written to the address word.

The extra space includes the boundary pointer BD_P that stores therein the boundary BD indicative of the two-division position for the plurality of blocks of the array, the initial value area INT in which the initial value for the elements is stored, and a WB pointer WB_P that stores therein the position of a fractional block WB described below. To the boundary pointer BD_P, the index "6" located to the right of the boundary BD is written. To the initial value area INT, the initial value "0" is written by way of example. To the WB pointer WB_P, the index "12" is written.

As described above, the boundary BD at which the array AR is divided into two areas is selectively positioned such that the ratio of the number of the unwritten blocks MP in the M area to the number of the written blocks WP in the W area is 1:2. Circulating links C_LNK are created using one unwritten block MP in the M area and two written blocks WP in the W area. As illustrated in FIG. 30, in the address words AWD (words with indices 3, 9, 15) of the three blocks (one MP and two WPs) forming the cyclic link, the indices "9", "15", "3" of the respective link destination blocks are stored. The three links C_LNK allow the one MP and the two WPs to be cyclically linked together to form a cyclic link.

As is the case with bidirectional links, formation of cyclic links precludes values from being written to the address words AWD of the written blocks WP in the W area. Thus, the values of the address words AWD (indices 9, 15) of the written blocks WP are written to the data words DWD (indices 4, 5) of the unwritten block MP in the M area forming cyclic links with the written blocks WP in the W area.

However, in the present embodiment, the array may fail to be divided such that the ratio of the number of the unwritten blocks MP in the M area to the number of the written blocks WP in the W area is 1:2. For example, if an odd number of (for example, three) written blocks WP are present in the W area, when the boundary BD is set at a position where one unwritten block MP is present in the M area, the ratio of the number of MPs to the number of WPs is 1:3. On the other hand, when the boundary BD is set at a position where two unwritten blocks MP are present in the M area, the ratio of the number of MPs to the number of WPs is 2:3. In both of the above-described cases, the ratio fails to be 1:2. If one written block WP is present in the W area, the unwritten blocks MP in the M area and the written block WP in the W area also fail to have the 1:2 relation. In this case, at most one block in the W area is treated as a fractional block WB, and the WB pointer WB_P indicative of the position of the fractional block WB is provided as an extra management area.

During predetermined write, a fractional block WB is generated and initialized using the initial value, and a write value is written directly to the fractional block WB, as described below. In other words, as is the case with the unwritten blocks MS in the M area, the fractional block WB is treated as an independent written block in the W area for which no link has been formed. Moreover, when k−1 fractional blocks are generated, the predetermined write allows a cyclic link to be generated. Conversely, a fractional block is added to the cyclic link during predetermined extend. Absence of a fractional block allows a cyclic link to be removed to reduce the number of cyclic links.

As described above, the management information on the unwritten blocks MP in the M area and the written blocks WP in the W area is stored in the array by managing the boundary BD such that the ratio of the number of the unwritten blocks MP in the M area to the number of the written blocks WP in the W area is 1:2 and forming cyclic links between the one block MP and the two blocks WP. When the array fails to be divided such that the unwritten blocks MP in the M and the written blocks WP in the W area have the 1:2 relation, fractional blocks are utilized.

[Read "read(i)"]

Figure 31:
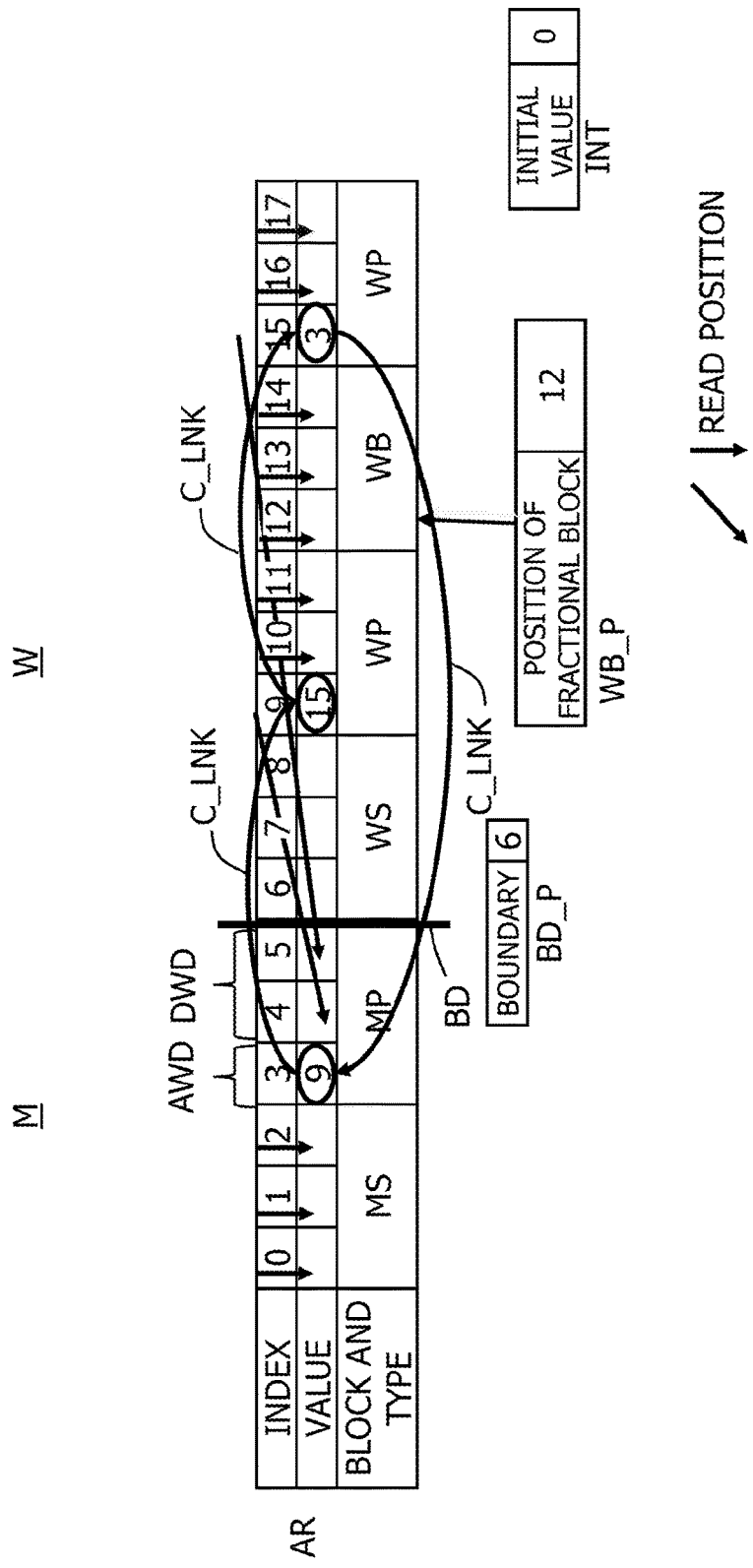
FIG. 31 is a diagram illustrating read control of the array in the fourth embodiment.

FIG. 31 is a diagram illustrating read control of the array in the fourth embodiment. The read is similar to the read in the first embodiment in which the array is divided so as to have the ratio of 1:1. In other words, in the read from an unwritten block MP, WS, the value "0" in the initial value area INT is returned. In the read from a written block MS, the value of the index i for the read "read(i)" is returned. In the read from a written block WP, the value of the data word of the block MP forming a cyclic link is returned if the index i is an address word. The value of the index i is returned if the index i is a data word. In the read from a fractional block WB, the value of the index i is returned.

[Removal (Unlink) "unlink" of an Undesired Link]

Figure 32:
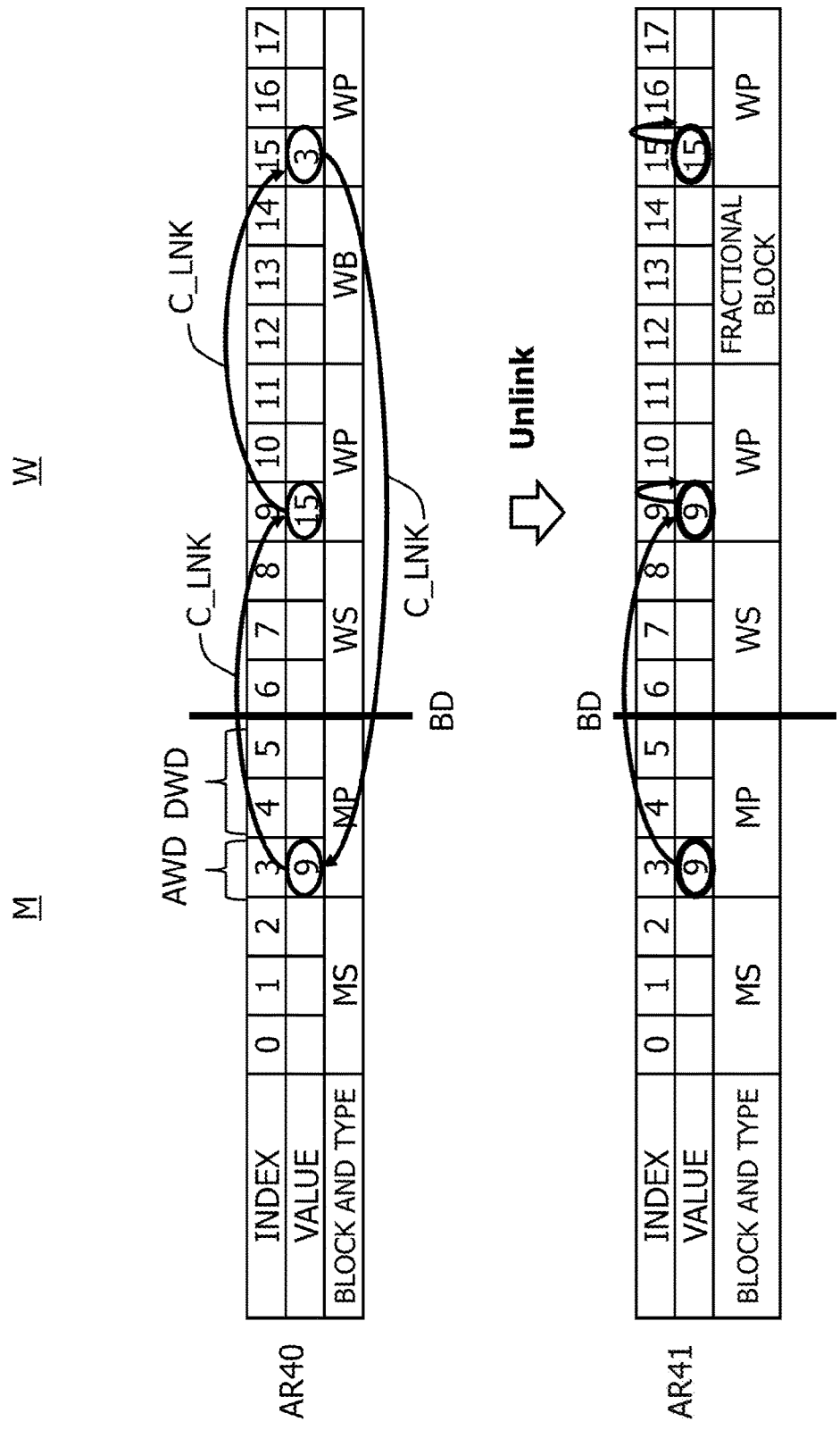
FIG. 32 is a diagram illustrating unlink control in which an undesired link is removed.

FIG. 32 is a diagram illustrating unlink control in which an undesired link is removed. The unlink is similar to the unlink in the first embodiment in which the array is divided so as to have the ratio of 1:1. In other words, to the words at the indices "9" and "15" for the block WP in FIG. 32, the indices "9" and "15" for the block WP are written to remove the two links. This removes the cyclic links.

[Extend "extend( )"]

(1) First, when the type of the block in the W area that is adjacent to the boundary is the unwritten block WS, the same control as that in the example in which the array is divided to have the ratio of 1:1 is performed as shown in FIG. 11. In other words, the initial value "0" is written to the unwritten block WS, the boundary is shifted, and the unwritten block WS is changed to a written block MS using "unlink". An empty block acquired by the written block MS is provided as a return value.

Second, when the type of the block in the W area that is adjacent to the boundary is the written block WP, the process executed varies depending on whether or not a fractional block is present (the "extend" processes (2) and (3) described below).

Figure 33:
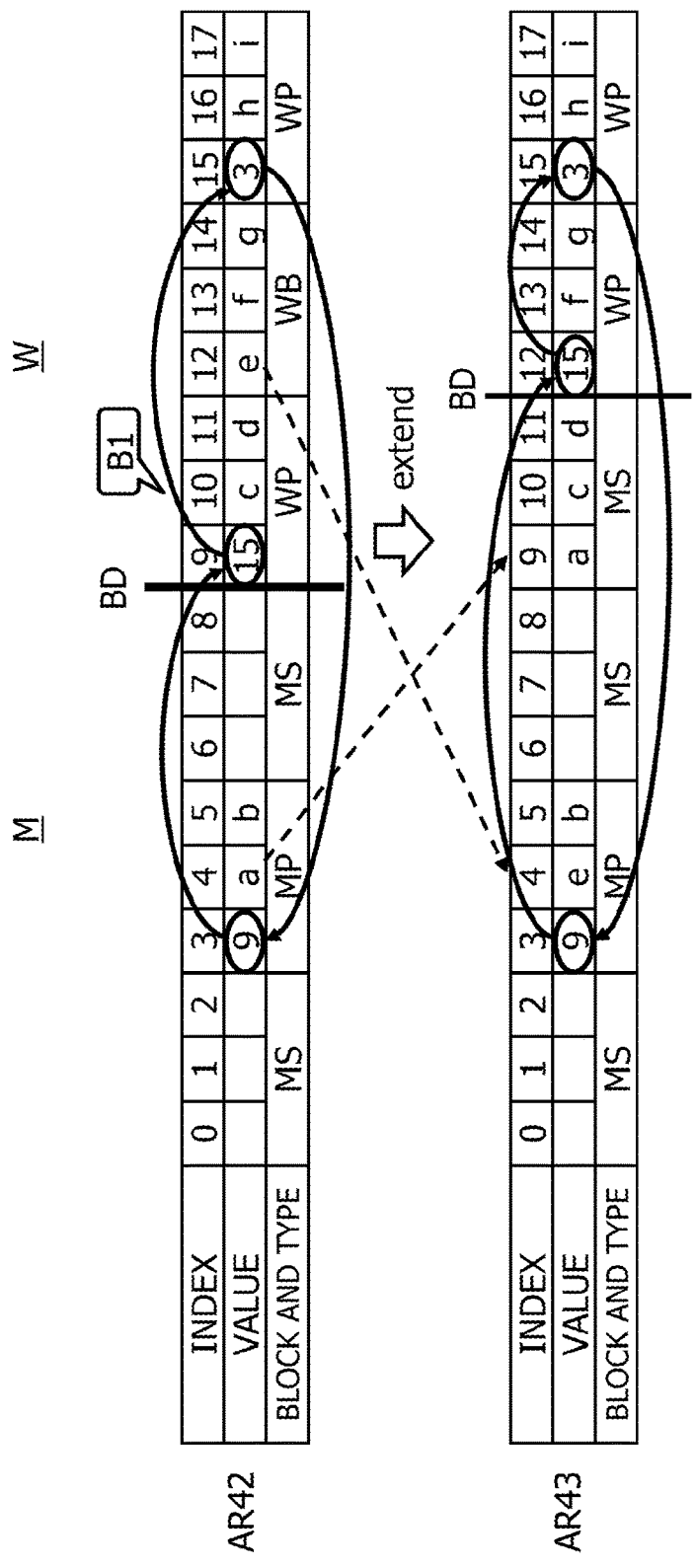
FIG. 33 is a diagram illustrating an "extend" process executed when a WP in the W area is adjacent to the boundary and a fractional block is present.

(2) FIG. 33 is a diagram illustrating an "extend" process executed when a WP in the W area is adjacent to the boundary and a fractional block is present. In an array AR42, cyclic links are formed, the block B1 in the W area that is adjacent to the boundary BD is a written block WP, and a fractional block WB is present. Thus, instead of the adjacent block B1 (WP), the fractional block WB is added in the cyclic links and changed to a written block WP. In this process, the value "a" of the index "4" is written to the address word (index "9") of the adjacent block B1 (WP), and the boundary BD is shifted to change the adjacent block B1 (WP) to a written block MS. Moreover, the value "e" of the index "12" of the fractional block WB is written to the index "4", and "15" is written to the index "12" to change the fractional block WB to a WP. As a result, an array AR43 is formed.

Figure 34:
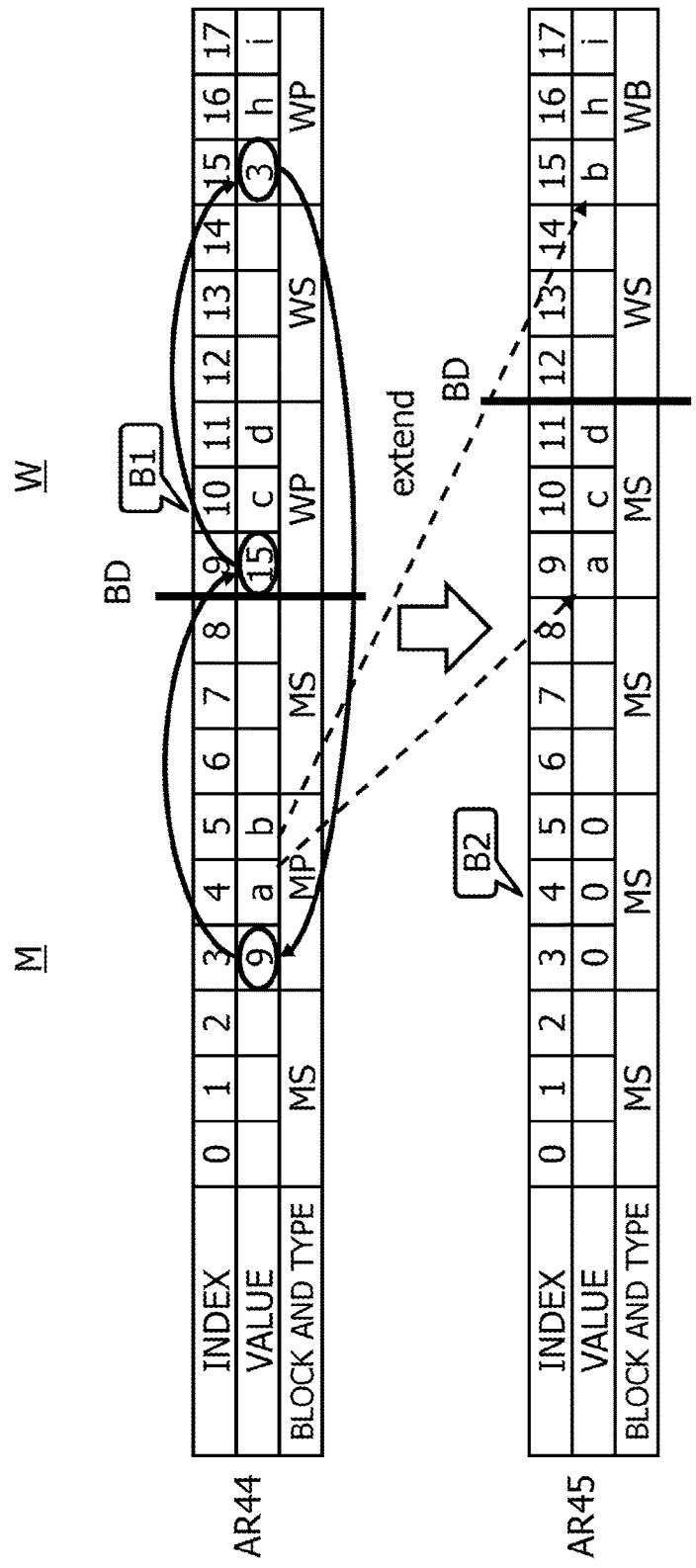
FIG. 34 is a diagram illustrating an "extend" process executed when a WP block in the W area is adjacent to the boundary and no fractional block is present.

In this state, the extend "extend( )" is further executed on the array AR43. This "extend" involves no fractional block, and thus, a process described below for FIG. 34 is executed to allow an empty block MS to be acquired. In other words, the "extend" is performed twice to acquire the empty block MS on which the write is to be executed.

(3) FIG. 34 is a diagram illustrating an "extend" process executed when a WP block in the W area is adjacent to the boundary and no fractional block is present. In an array AR44, cyclic links are formed, the block B1 in the W area that is adjacent to the boundary BD is a written block WP, and no fractional block WB is present. In this case, the cyclic links are broken down into two blocks MS and one fractional block WB. In this process, the value "a" of the index "4" is written to the index "9" and the boundary BD is shifted to change the adjacent block B1 to a written block MS from WP. Moreover, the value "b" of the index "5" is written to the index "15" to generate a fractional block WB. The block MP with the index "3" included in the cyclic links is initialized using the initial value "0" and thus changed to an empty block MS (B2).

(4) If a fractional block WB in the W area is adjacent to the boundary, the boundary BD is shifted to change the fractional block WB to a written block MS, and the "extend" is performed again. The second "extend" allows an empty block MS to be acquired.

As described above, the "extend" functions as follows. When a written block WP is adjacent to the boundary, if a fractional block is present, the fractional block is included in the cyclic links and eliminated. If no fractional block is present, the cyclic links are broken down and eliminated. Consequently, the number of cyclic links is reduced.

[Write "write(1)"]

(1) When the write destination block B1 with the index i is a written block MS, WP, the write process executed is the same as the write process executed in the example in which the array is divided so as to have the ratio of 1:1 as illustrated in FIG. 14. When the write destination block B1 is an unwritten block MP, the write process executed is the same as the write process executed in the example in which the array is divided so as to have the ratio of 1:1 as illustrated in FIG. 15 and FIG. 17.

(2) When the write destination block B1 is a fractional block WB, the write is executed directly on the fractional block. This processing is the same as the processing executed when the write destination block is a block MS.

When the write destination block B1 is an unwritten block WS, the write process varies depending on whether or not a fractional block is present (the write processes (3) and (4) described below).

Figure 35:
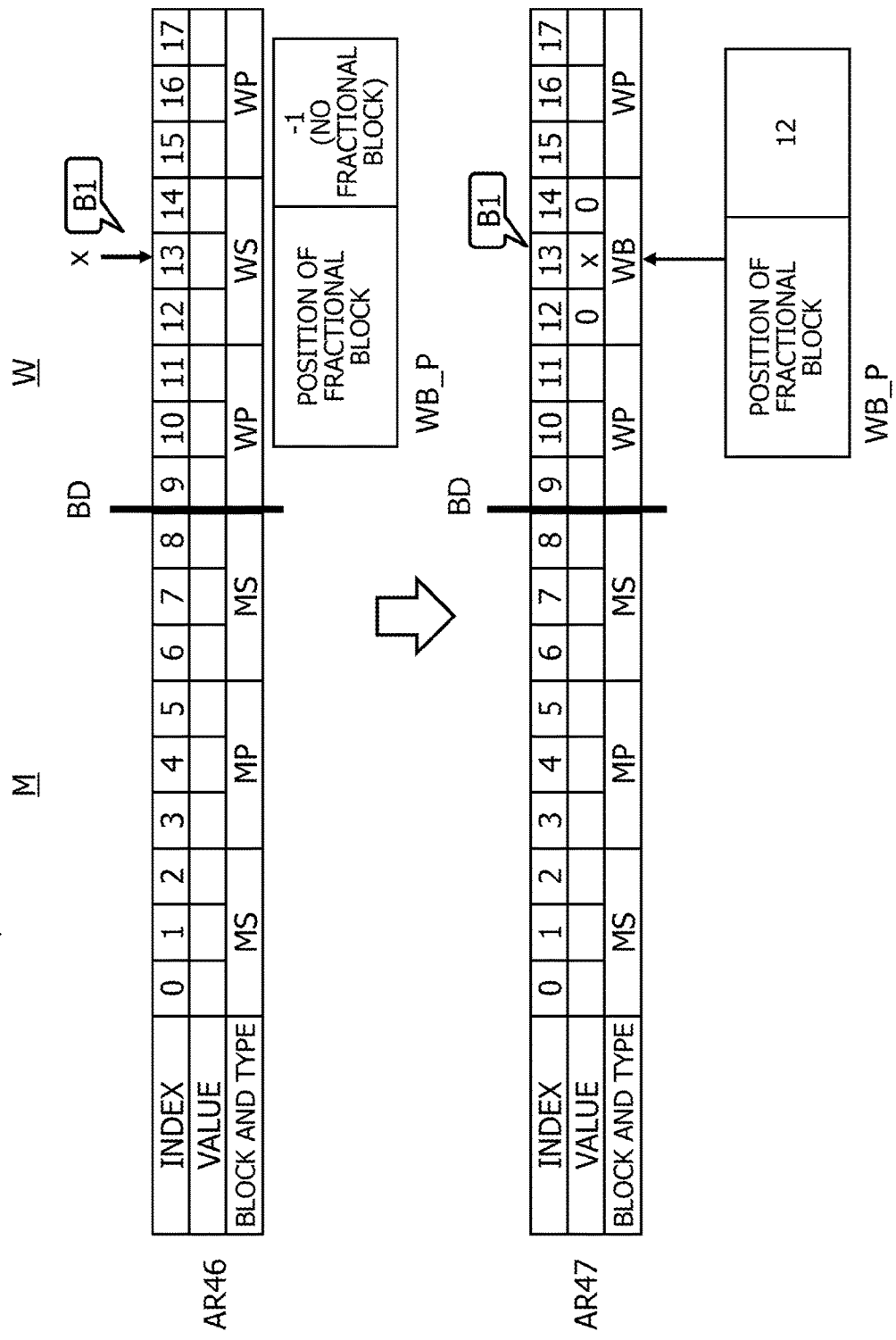
FIG. 35 is a diagram illustrating the write process executed when the write destination block B1 is an unwritten block WS and no fractional block WB is present.

(3) FIG. 35 is a diagram illustrating the write process executed when the write destination block B1 is an unwritten block WS and no fractional block WB is present. In this case, the unwritten block WS corresponding to the write destination block B1 is initialized using the initial value "0" and changed to a fractional block WB. A value X is written to the index i (i=13) of the fractional block WB. In this case, the "extend" is not executed. A fractional block is newly generated, and no cyclic links are generated.

Figure 36:
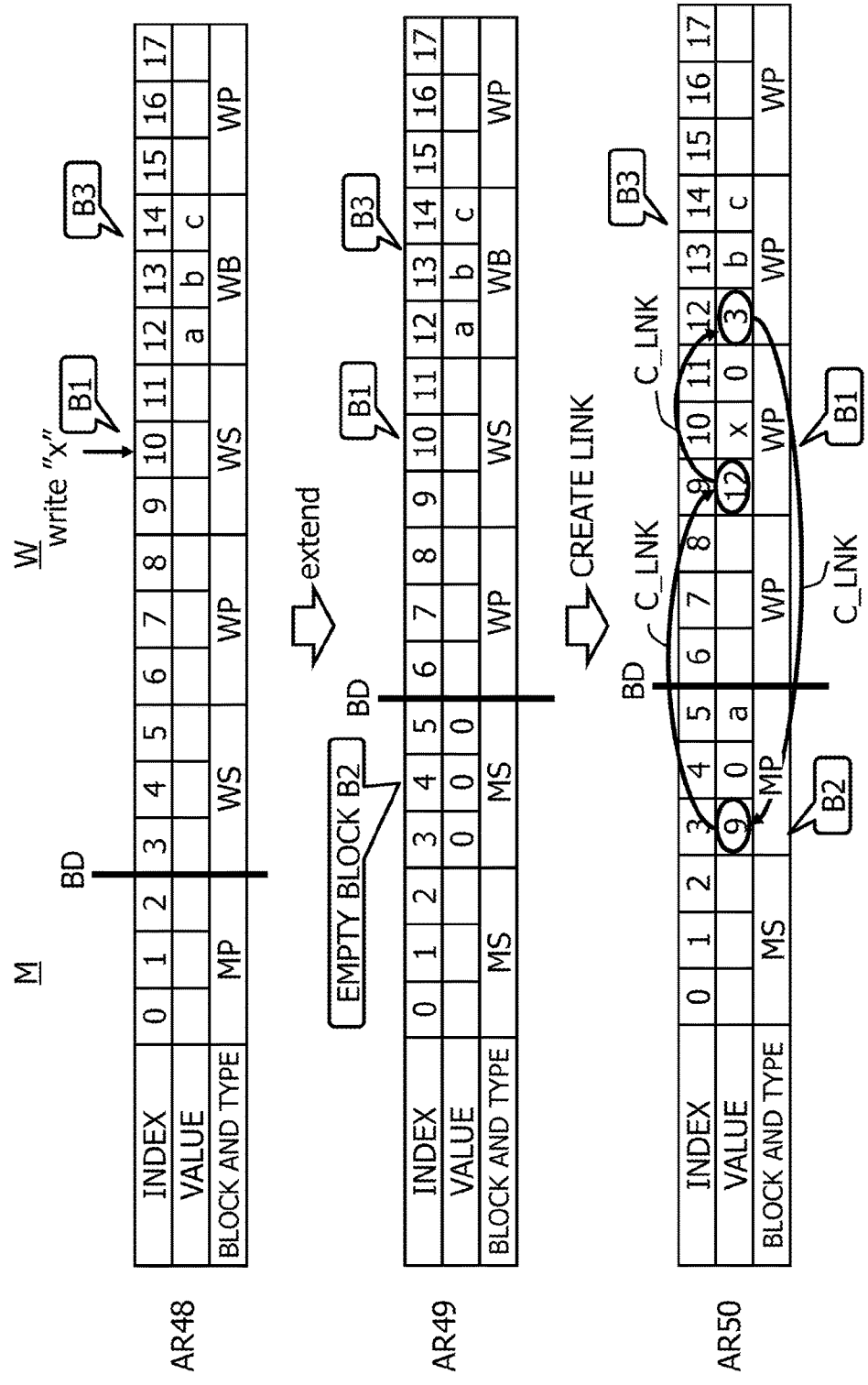
FIG. 36 is a diagram illustrating the write process executed when the write destination block B1 is an unwritten block WS and a fractional block WB is present.

(4) FIG. 36 is a diagram illustrating the write process executed when the write destination block B1 is an unwritten block WS and a fractional block WB (B3) is present. In this case, the "extend" is executed on an array AR48 to acquire an initialized block MS (on which the write has been executed) as an empty block B2. See AR49. Then, cyclic links C_LNK are created using the write destination block B1 (WS), the empty block B2 (MS), and the fractional block B3 (WB). The write value "X" is written to the index i of the write destination block B1 (WP) for which cyclic links have been formed. See AR50.

However, when the write destination block B1 is changed to the type other than WS as a result of the "extend", the write process corresponding to that block type is executed.

As described above, when the write destination block B1 is an unwritten block WS, if no fractional block is present, a fractional block WB is generated and the write is executed on the fractional block WB. If a fractional block is present, cyclic links are generated to change the B1 into WP and the write value "X" is written to the B1 (WP). In other words, MP:WP=1:2, and thus, one write is executed to temporarily generate a fractional block, and another write is executed to generate a cyclic link. This increases the number of cyclic links.

[1:k (k is an integer 1)]

As is understood from the above-described example of the ratio of 1:2, even when MP:WP is 1:3 or 1:4, fractional blocks can be utilized to similarly manage the unwritten blocks MP and the written blocks WP using links that allow the ratio of 1:3 or 1:4 to be achieved. For the ratio of 1:3, at most two blocks in the W area are treated as fractional blocks. For the ratio of 1:4, at most three blocks in the W area are treated as fractional blocks.

For the ratio of 1:k, at most k−1 blocks in the W area are treated as fractional blocks, and the "extend" is executed up to k times. The process can be executed in the time represented as O (1) so long as k is a constant. For example, the write is executed to generate fractional block and reaching k−1 fractional blocks, and thereafter, the write is further executed to generate cyclic blocks having one MP and k WPs (1 WS and k−1 fractional blocks). Furthermore, the "extend" is executed to add any of the fractional blocks in the cyclic blocks so as to reduce the number of fractional blocks and become zero fractional block, and thereafter, the "extend" is further executed to break down any of the cyclic blocks so as to reduce the number of cyclic blocks.

Even when MP:WP is any integer ratio (L:K, L and K are each an integer equal to or larger than 1), the extension of the above-described example of the ratio of 1:k enables the unwritten blocks MP and the written blocks WP to be managed using values in the array as described above. In other words, L unwritten blocks MP in the M area and K−1 fractional blocks in the W area are formed. Then, the write is executed to generate cyclic blocks in the ratio of L:K. Further, the "extend" is executed to break down the cyclic blocks. When the fractional blocks are eliminated to zero, the cyclic blocks are further broken down.

Therefore, in the above-described embodiments, the management is performed in which the array is divided into two areas such that the number of unwritten blocks MP and the number of written blocks WP are in any integer ratio. Then, the processing time can be set to the fixed time O (1), and the size can be set to the small size O (log N) or the fixed size O (1).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium storing therein an array control program causing a computer to execute a process of controlling an initializable array, the initializable array having an array including consecutively a plurality of blocks each having two or more of a constant number of words including at least an address word and a data word, a boundary indicative of a two-division position where the plurality of blocks of the array is divided into two divided areas and an initial value for each element of the array being stored, the boundary being a position where a ratio for the number of unwritten blocks in a first area of the two divided areas and the number of written blocks in a second area of the two divided areas is an integer ratio, the process comprising:

when write to an unwritten block in the first area or an unwritten block in the second area is invoked, executing an extend process of shifting the boundary to extend the first area and generating an initialized written block in the first area;

in a case where a write destination block for the write is not the same as the initialized written block generated by the extend process but is an unwritten block in the second area, executing a link process that includes storing an address of the write destination block in the second area, in the address word of the initialized written block in the first area generated by the extend process, and storing, in the address word of the write destination block in the second area, an address of the initialized written block in the first area generated by the extend process, to form a link; and writing a write value to the write destination block in the second area.

2. The non-transitory computer-readable storage medium according to claim 1, wherein
the writing the write value to the write destination block in the second area includes
writing the write value to an element of a write destination index when the write destination index is the data word, and
writing the write value to the data word of the unwritten block in the first area that forms a link with the write destination block in the second area when the write destination index is the address word.

3. The non-transitory computer-readable storage medium according to claim 1, the process further comprising:
when initialization is invoked, executing an initialization process of initializing a position of the boundary such that all the blocks are unwritten blocks in the second area, and storing an initial value of the initialization.

4. The non-transitory computer-readable storage medium according to claim 3, the process further comprising:
when read is invoked, executing a read process that includes
returning the initial value in a case where the a read destination block is an unwritten block;
returning a value at a read destination index in a case where the read destination block is a written block in the first area; and
returning, in a chase where the read destination block is a written block in the second area, the value at the read destination index when the read destination index is the data word, and returning data in the data word of the unwritten block in the first area that forms the link with the read destination block when the read destination index is the address word.

5. The non-transitory computer-readable storage medium according to claim 3, wherein
the initializable array has, in addition to the array, a boundary area in which the boundary is stored and an initial value area in which the initial value is stored, and
the initialization process includes writing an index located at an end of the array to the boundary area and writing the initial value to the initial value area.

6. The non-transitory computer-readable storage medium according to claim 3, wherein the initial value is associated with an initialization function that returns an initial value in association with the index.

7. The non-transitory computer-readable storage medium according to claim 3, wherein
the initializable array has, in addition to the array, an area storing an extend completion flag indicating that the extend process is completed,
each of the plurality of blocks has data words, the number of which is equal to or larger than the number of words for storing management information plus 2 corresponding to the address word and the data word,
the initialization process includes writing the boundary and the initial value to the words for storing the management information in a final block in the second area that transforms to the first area latest and clearing the extend completion flag to an incompletion state,
writing the write value includes writing the write value to the data word of the unwritten block in the first area that forms a link with the final block in the second area when the write destination index is the word for storing the management information in the final block in the second area, and
the extend process includes setting the extend completion flag to a completion state when the extend process changes the final block in the second area to a block in the first area.

8. The non-transitory computer-readable storage medium according to claim 1, the process further comprising:
determining whether an access destination is a block in the first area or a block in the second area, based on an access destination index and the boundary, and determining whether the access destination is an unwritten block in the first area or a written block in the second area, based on whether or not the access destination block forms the link.

9. The non-transitory computer-readable storage medium according to claim 1, the process further comprising:
when a value of a written block in the first area is changed and an unintended link is formed, executing an unlink process of changing the address word of an unwritten block in the second area so as to prevent formation of a link between the unwritten block in the second area and the written block in the first area.

10. The non-transitory computer-readable storage medium according to claim 1, the process further comprising:
when the write destination block is an unwritten block in the first area or an unwritten block in the second area and is the same as the initialized written block generated by the extend process,
writing the write value to the write destination block and executing an unlink process of removing an unwanted link to the write destination block.

11. The non-transitory computer-readable storage medium according to claim 1, the process further comprising:
when the write destination block is not the same as the initialized written block generated by the extend process but is an unwritten block in the first area,
writing a value of the unwritten block in the first area, which is the write destination block, to an initialized written block in the first area generated by the extend process to generate a link between a written block in the second area that has a link with the unwritten block in the first area, which is the write destination block, and the initialized written block in the first area generated by the extend process, and
writing the write value to the unwritten block in the first area, which is the write destination block.

12. The non-transitory computer-readable storage medium according to claim 1, wherein
the integer ratio is 1:k, and the k is an integer equal to or larger than 1, and
the link is a link circulating between one unwritten block in the first area and k written blocks in the second area.

13. The non-transitory computer-readable storage medium according to claim 1, wherein
the integer ratio is 1:k, and the k is an integer equal to or larger than 2, and
at most k−1 blocks in the second area are managed as initialized fractional blocks.

14. The non-transitory computer-readable storage medium according to claim 13, the process further comprising:
when the write destination block is an unwritten block in the second area,
in a case where the number of the fractional blocks is smaller than k−1, initializing the write destination block to change the write destination block to a fractional block and writing the value to the fractional block; and in a case where k−1 fractional blocks are present, executing the extend process to generate the initialized written block in the first area, and generating cyclic links among the write destination block and the k−1 fractional blocks and the initialized written block in the first area, and moreover writing the write value to the write destination block.

15. The non-transitory computer-readable storage medium according to claim 1, wherein the integer ratio is L:K, and the L and K are each an integer equal to or larger than 1, and the link is a link circulating between L unwritten blocks in the first area and K written blocks in the second area.

16. A method of controlling an initializable array, the initializable array having an array including consecutively a plurality of blocks each having two or more of a constant number of words including at least an address word and a data word, a boundary indicative of a two-division position where the plurality of blocks of the array is divided into two divided areas and an initial value for each element of the array being stored, the boundary being a position where a ratio for the number of unwritten blocks in a first area of the two divided areas and the number of written blocks in a second area of the two divided areas is an integer ratio, the method comprising:

when write to an unwritten block in the first area or an unwritten block in the second area is invoked, executing an extend process of shifting the boundary to extend the first area and generating an initialized written block in the first area;

in a case where a write destination block for the write is not the same as the initialized written block generated by the extend process but is an unwritten block in the second area, executing a link process that includes storing an address of the write destination block in the second area, in the address word of the initialized written block in the first area generated by the extend process, and storing, in the address word of the write destination block in the second area, an address of the initialized written block in the first area generated by the extend process, to form a link; and writing a write value to the write destination block in the second area.

17. An array control device comprising:

a memory storing an initializable array having an array including consecutively a plurality of blocks each having two or more of a constant number of words including at least an address word and a data word, a boundary indicative of a two-division position where the plurality of blocks of the array is divided into two divided areas and an initial value for each element of the array being stored, the boundary being a position where a ratio for the number of unwritten blocks in a first area of the two divided areas and the number of written blocks in a second area of the two divided areas is an integer ratio; and a processor being accessible to the memory that when write to an unwritten block in the first area or an unwritten block in the second area is invoked, executes an extend process of shifting the boundary to extend the first area and generating an initialized written block in the first area, in a case where a write destination block for the write is not the same as the initialized written block generated by the extend process but is an unwritten block in the second area, executes a link process that includes storing an address of the write destination block in the second area, in the address word of the initialized written block in the first area generated by the extend process, and stores, in the address word of the write destination block in the second area, an address of the initialized written block in the first area generated by the extend process, to form a link; and writes a write value to the write destination block in the second area.

* * * * *